United States Patent
Valverde et al.

(10) Patent No.: US 12,524,084 B2
(45) Date of Patent: Jan. 13, 2026

(54) MOUSE BUTTON WITH MODULAR CLICKING ARCHITECTURE

(71) Applicant: Logitech Europe S.A., Lausanne (CH)

(72) Inventors: Nuno Miguel Pereira Dos Anjos Valverde, Bandon (IE); Léo Zeender, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/665,260

(22) Filed: May 15, 2024

(65) Prior Publication Data

US 2025/0355511 A1    Nov. 20, 2025

(51) Int. Cl.
  *G06F 3/0354*    (2013.01)
  *G06F 3/038*    (2013.01)
(52) U.S. Cl.
  CPC ........ *G06F 3/03543* (2013.01); *G06F 3/0383* (2013.01)
(58) Field of Classification Search
  CPC ..................... G06F 3/03543; G06F 2203/0333
  USPC ........................................................ 345/163
  See application file for complete search history.

(56) References Cited

U.S. PATENT DOCUMENTS

| 8,363,013 B2* | 1/2013 | Chang ................. G06F 3/03543 345/163 |
| 10,824,248 B2* | 11/2020 | Liu ....................... G06F 3/0202 |
| 2017/0220139 A1* | 8/2017 | Forde ................. G06F 3/03543 |

* cited by examiner

*Primary Examiner* — Koosha Sharifi-Tafreshi
(74) *Attorney, Agent, or Firm* — Kilpatrick Townsend & Stockton LLP

(57) ABSTRACT

A computer mouse comprising a chassis, a support beam with a first end configured to receive and secure a removable keyplate and a second end opposite the first end, and a keyswitch coupled to the chassis in an inverted configuration. In operation, the second end portion of the support beam moves up and contacts the keyswitch as the first end of the support beam is moved down. The keyswitch module may be operable to be coupled to the chassis at a plurality of different coupling locations, each coupling location operable to cause the second pressing force on the keyswitch to increase or decrease based on a distance from the keyswitch to the fulcrum. The keyplate can be non-destructively removeable from and couplable to the support beam without disassembly of the housing. The keyswitch can be non-destructively removeable from and couplable to the chassis without disassembly of the housing.

20 Claims, 19 Drawing Sheets

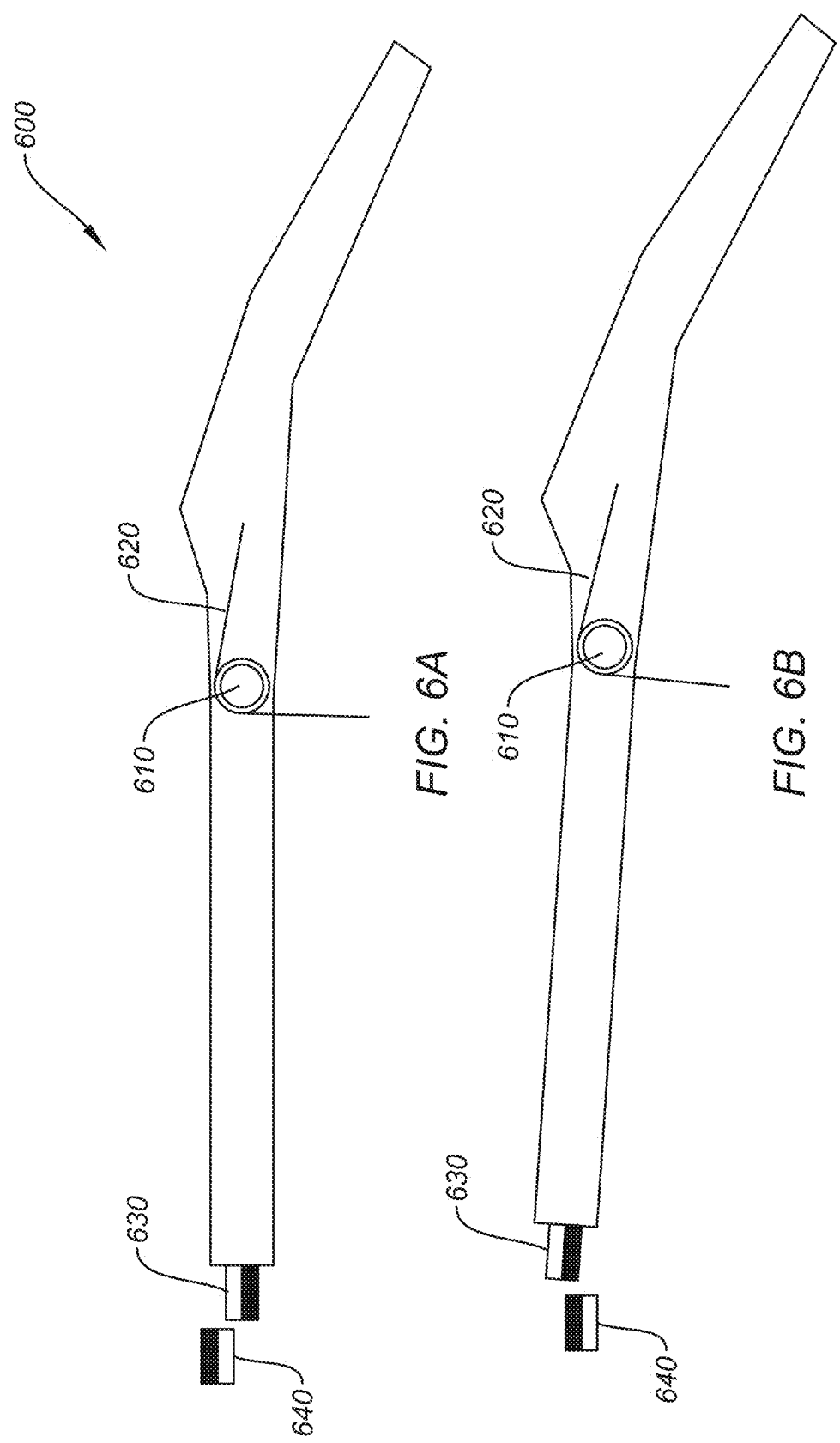

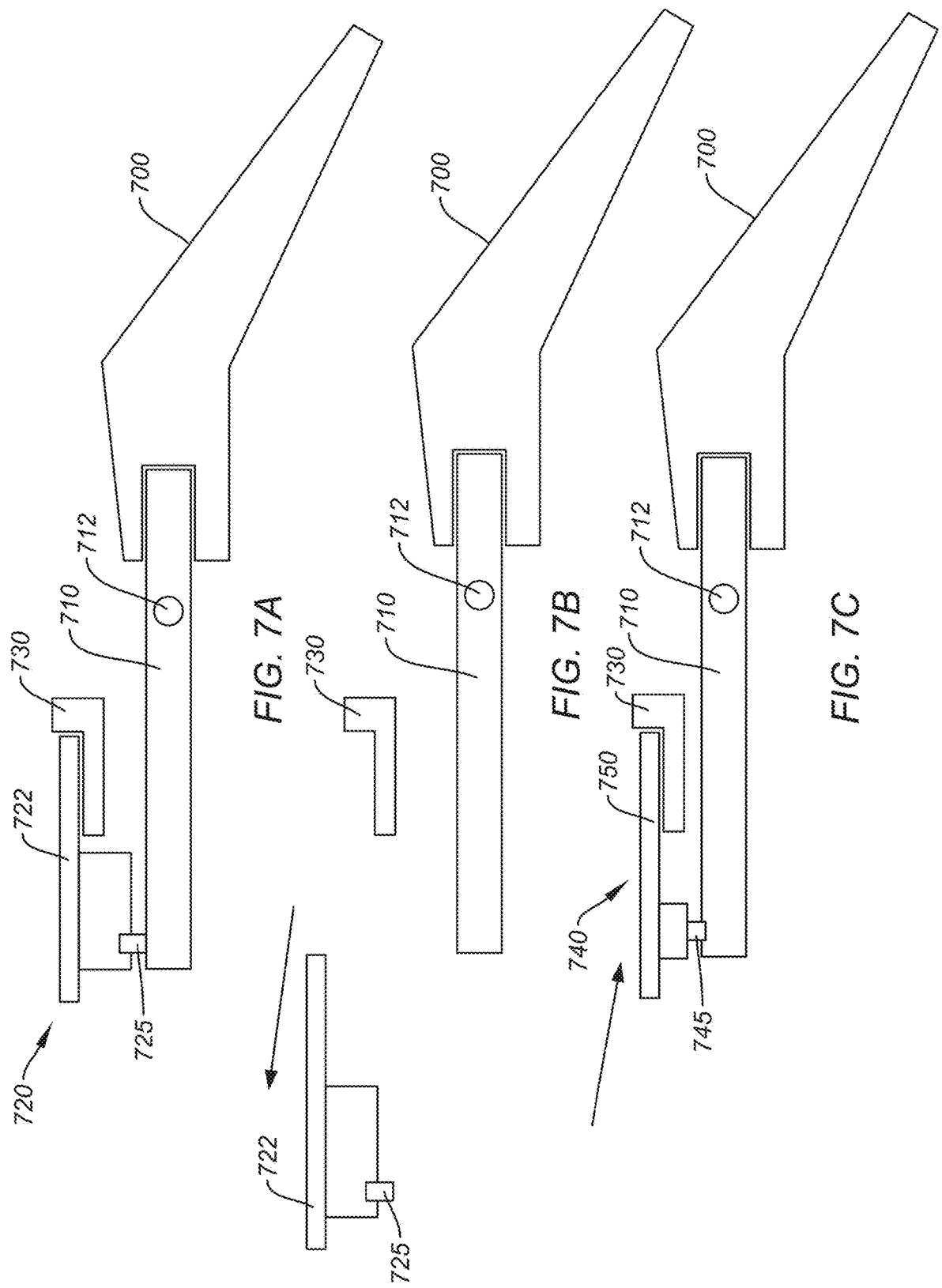

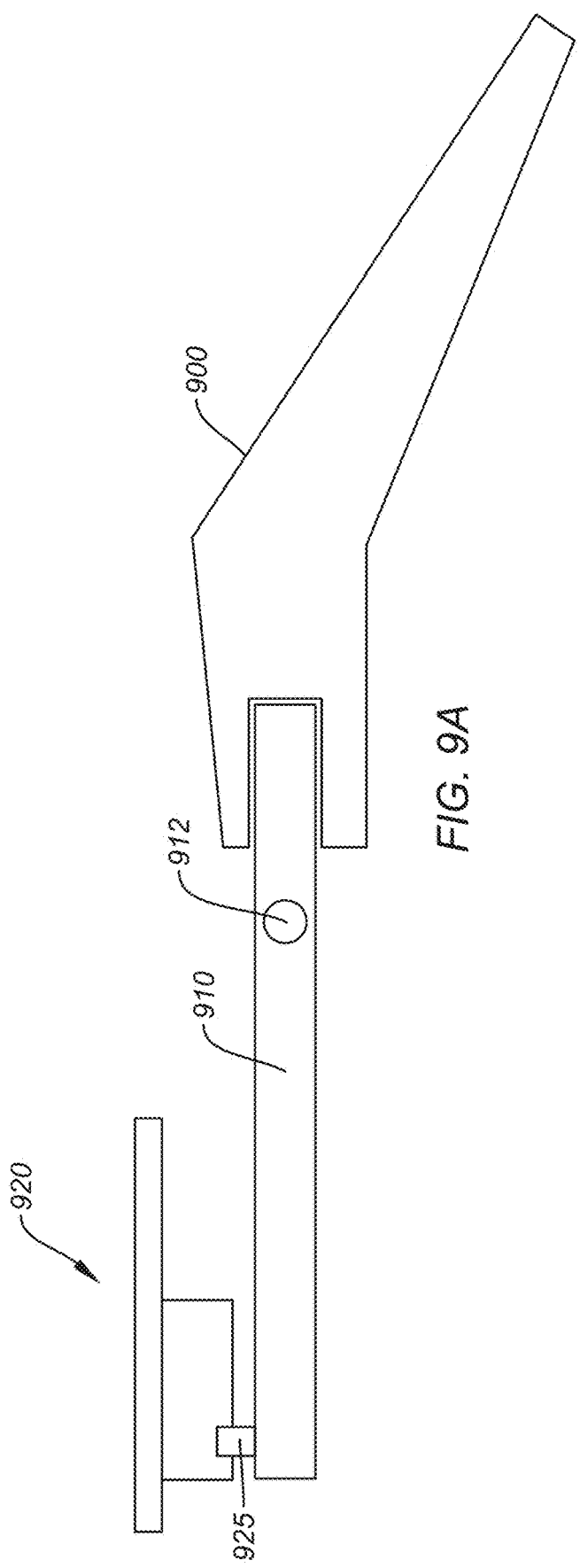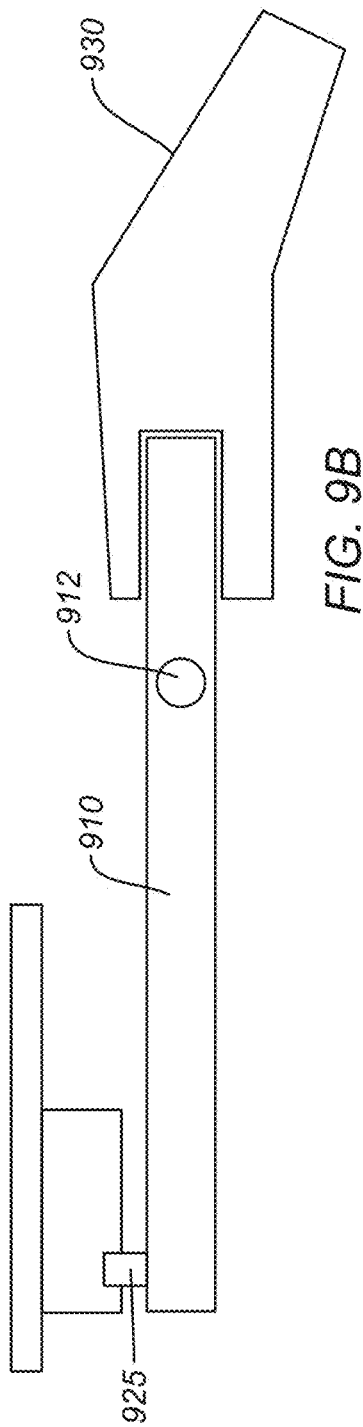

Rack Position Compliant Teeth
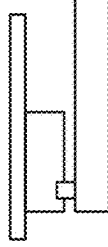
FIG. 10A
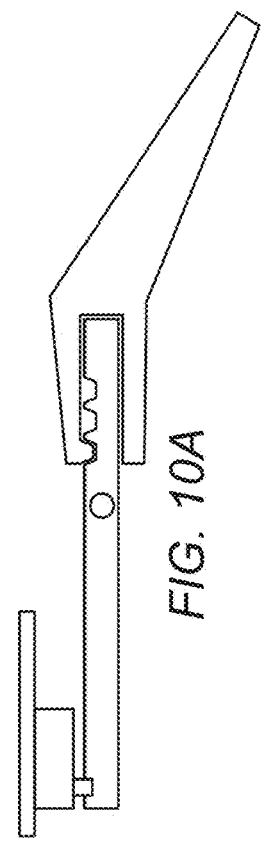
FIG. 10B
Magnet Position
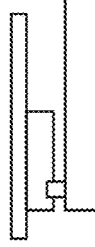
FIG. 10C
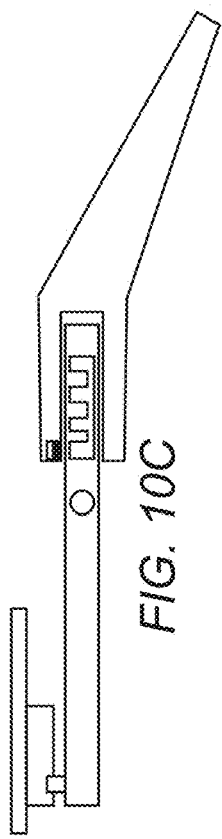
FIG. 10D
Spring Loaded Ball Rack
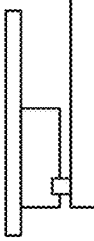
FIG. 10E
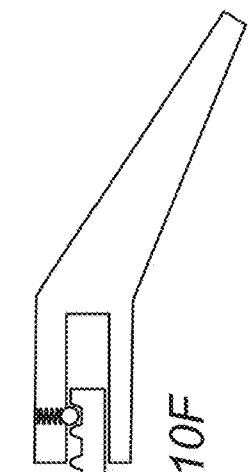
FIG. 10F
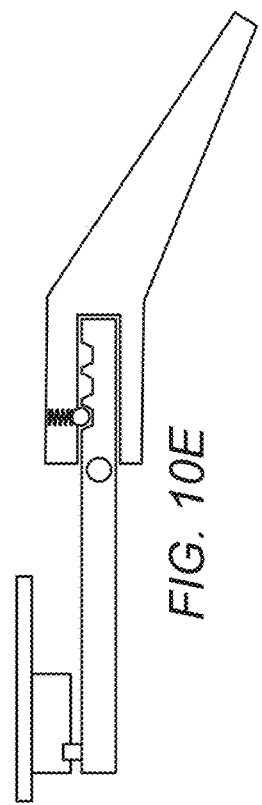

Light Projection on Table

Light in Lightpipe in Keyplate

Light Projection on the Bottom of Keyplate

Light Inserted in Keyplate

MOUSE BUTTON WITH MODULAR CLICKING ARCHITECTURE

BACKGROUND

Computer mice are computer peripheral devices that are typically used to control aspects of a host computing device, such as a cursor on a graphical user interface (GUI). There have been many useful innovations with computer mouse over the last few decades including improved tracking (e.g., optical tracking), acceleration and/or momentum tracking (e.g., via inertial measurement unit (IMU)), enhanced functions (e.g., pressable scroll wheel, programmable buttons, etc.), as well as ergonomics and more.

Some computer mice may be designed for productivity (e.g., office use), while others may be configured for competitive gaming. Each type can have significantly different features that better adapt the computer mouse to the particular task. For instance, computer mouse may differ in the size/shape/weight of keyplates, buttons, and key switch characteristics. Some of these features may even be better adapted to subcategories of gaming, which may cause some gamers to opt to purchase multiple computer mice so they can have a personally optimal combination of features depending on the application in use. This can be costly and wasteful, thus better solutions are needed.

BRIEF SUMMARY

In certain embodiments, a computer mouse comprises: a chassis; a support beam including a first end configured to receive and secure a removable keyplate; a second end opposite the first end; and a fulcrum positioned between the first end and the second end, the fulcrum coupled to the chassis such that the support beam is operable to rotate in a plane orthogonal to orientation of the fulcrum; and a keyswitch coupled to the chassis in an inverted configuration, wherein the second end of the support beam moves up and contacts the keyswitch as the first end of the support beam is moved down. In some cases, the keyswitch is coupled to a circuit board mounted to the chassis forming a keyswitch module, wherein when a top side of the first end of the support beam receives a first pressing force, the second end of the support beam moves up causing a top side of the second end to contact the keyswitch and provide a second pressing force proportional to the first pressing force, and wherein the keyswitch is operable to generate a control signal when the second pressing force reaches a threshold activation force that activates the keyswitch. In some embodiments, the keyswitch module is operable to be coupled to the chassis at a plurality of different coupling locations, each coupling location operable to cause the second pressing force on the keyswitch to increase or decrease based on a distance from the keyswitch to the fulcrum.

In certain embodiments, the fulcrum includes a pivoting aperture, and the computer mouse further includes a shaft configured within the pivoting aperture, wherein the support beam is rotatably coupled to the shaft, allowing the support beam to rotate on an axis that is colinear with the shaft. The computer mouse can further include a housing configured to house the chassis, the support beam, and keyswitch, wherein the keyswitch is non-destructively removeable from and couplable to the chassis without disassembly of the housing (e.g., the keyswitch can be installed and removed many times in a modular fashion). In some embodiments, the keyswitch is coupled to a modular circuit board, the modular circuit board being coupled to the chassis via at least one of: a frictional fit coupling; a magnetic coupling; or a mechanical, releasable coupling.

In some embodiments, the computer mouse further includes a housing configured to house the chassis, the support beam, and keyswitch, wherein the removeable keyplate is non-destructively removeable from and couplable to the support beam without disassembly of the housing. The removeable keyplate can be coupled to the support beam via at least one of: a frictional fit coupling; a rack and complementary compliant teeth coupling; magnetic coupling; or spring loaded ball rack coupling. The removeable keyplate can be operable to be coupled to the support beam at a plurality of different coupling locations, each coupling location operable to cause the first pressing force on the removeable keyswitch to increase or decrease based on a distance of the keyswitch to the fulcrum.

In some implementations, the removeable keyplate includes a transparent region, the modular computer mouse further comprising a lighting element coupled to the chassis under the removeable keyplate and configured to project light into the transparent region of the removeable keyplate. The removeable keyplate can include a light pipe region, the computer mouse further comprising a lighting element coupled to the chassis and configured to project light into the light pipe region of the removeable keyplate. In some cases, the computer mouse includes a lighting element coupled to the chassis under the keyplate and configured to project light into an underlying work surface directly under the removeable keyplate. In some embodiments, the removeable keyplate includes a transparent region, the computer mouse further comprising a lighting element configured within the support beam or the removeable keyplate and configured to project light into the transparent region of the removeable keyplate. In some implementations, the computer mouse further includes a housing including a top case and a bottom case, wherein the chassis, the support beam, and keyswitch are coupled to the top case, wherein the computer mouse includes manufacturing and assembly variation tolerances that aggregate as a tolerance stack, the tolerance stack associated with a placement of the chassis, the support beam, and the keyswitch relative to the top case, and wherein the tolerance stack is associated with the top case and is not substantially affected by the bottom case.

In certain embodiments, a computer mouse comprises: a chassis; a support beam including: a first end coupled to or integrated with a keyplate; a second end opposite the first end; and a pivot structure positioned between the first end and the second end, the pivot structure coupled to the chassis such that the support beam is operable to rotate; a keyswitch coupled to the chassis in an inverted configuration, wherein the second end of the support beam moves up and contacts the keyswitch as the first end of the support beam is moved down. In some cases, the keyswitch is coupled to a circuit board mounted to the chassis forming a keyswitch module, wherein when a top side of the first end of the support beam receives a first pressing force, the second end of the support beam moves up causing a top side of the second end to contact the keyswitch and provide a second pressing force proportional to the first pressing force, and wherein the keyswitch is operable to generate a control signal when the second pressing force reaches a threshold activation force that activates the keyswitch.

In some cases, the computer mouse further includes a lighting element coupled to the chassis under the keyplate and configured to project unobstructed light into an underlying work surface directly under the keyplate. The keyplate can include a transparent region, and the computer mouse can further comprise a lighting element configured within the support beam or the keyplate and configured to project light into the transparent region of the keyplate. In some cases, the keyplate includes a light pipe region, the computer mouse further comprising a lighting element coupled to the chassis and configured to project light into the light pipe region of the keyplate. The computer mouse can further includes a housing including a top case and a bottom case, wherein the chassis, the support beam, and keyswitch are coupled to the top case, wherein the computer mouse includes manufacturing and assembly variation tolerances that aggregate as a tolerance stack, the tolerance stack associated with a placement of the chassis, the support beam, and the keyswitch relative to the top case, and wherein the tolerance stack is associated with the top case and is not substantially affected by the bottom case.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIGS. 6A-6B show a keyplate with magnetic actuation, according to certain embodiments;

FIGS. 7A-7C show a sequence from removing and replacing a keyswitch module in a computer mouse, according to certain embodiments;

FIGS. 9A-9B show simplified block diagrams of coupling different modular keyplates to a computer mouse, according to certain embodiments;

FIGS. 10A-10F show various simplified block diagrams of different mechanisms for coupling a modular keyplate to a computer mouse, according to certain embodiments;

Throughout the drawings, it should be noted that like reference numbers are typically used to depict the same or similar elements, features, and structures.

DETAILED DESCRIPTION

Figure 1:
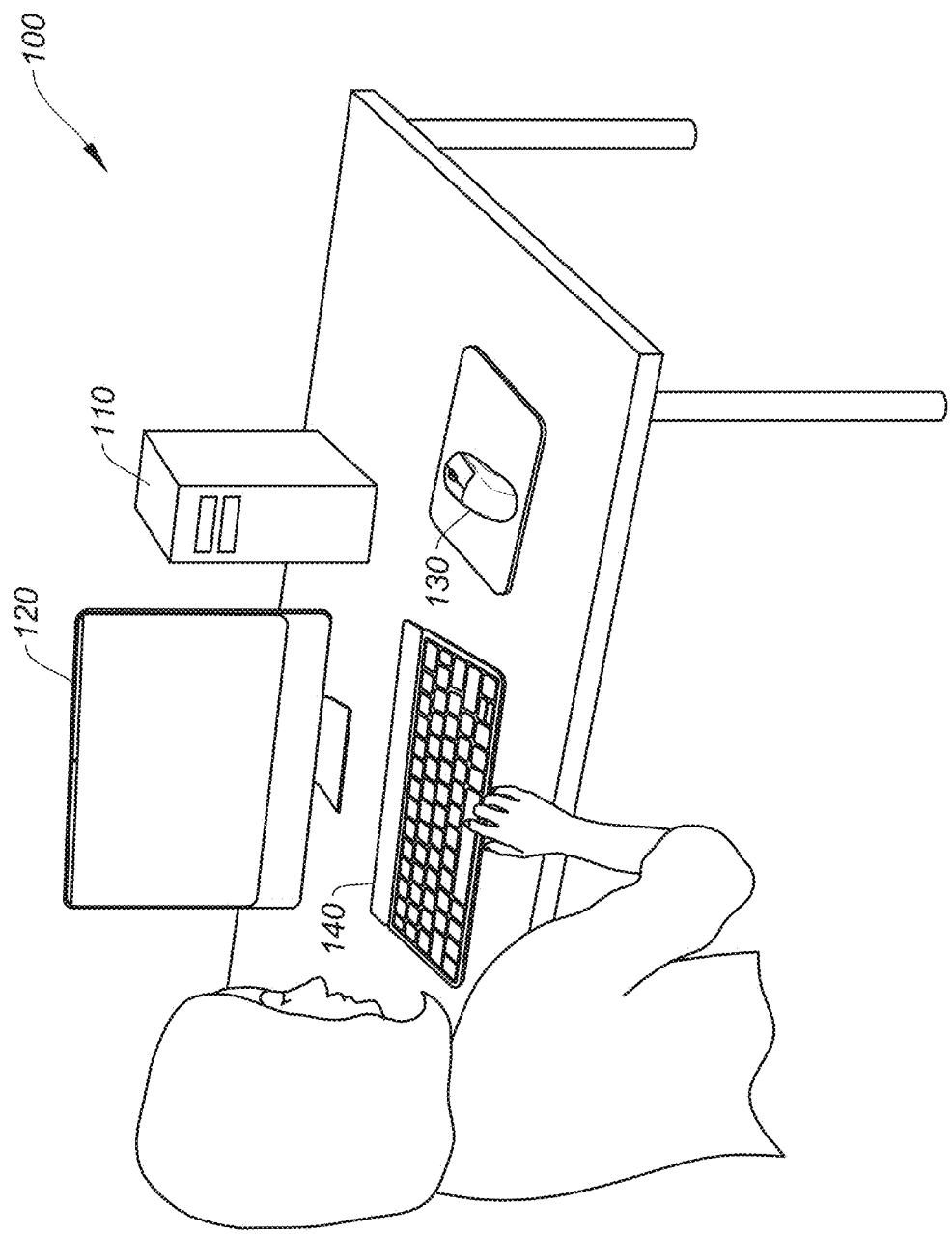
FIG. 1 shows a simplified example of a computer system that can include any of a variety of host computing devices and computer peripheral devices, including computer peripheral devices that can be configured to perform aspects of the various inventive concepts described herein.

Aspects of the present disclosure relate generally to computer peripheral devices, and more particularly to computer mice, according to certain embodiments.

In the following description, various examples of modular computer mice are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high-level summary is intended to provide a basic understanding of some of the novel innovations depicted in the figures and presented in the corresponding descriptions provided below. Aspects of the invention relate to a modular architecture of a computer mouse where elements can be brought together by design and choice from a palette of technologies. The same clicking design can accommodate different haptic or sensing elements, paired with any required mechanical features for good user experience (UX) and usability, and any combination thereof. Some embodiments can be designed such that the haptic element is configured toward or at the rear of the keyplate, reversing the clicking system by placing it behind (e.g., upside down with a normally open switch, right-side up for normally closed) a pivoting or hinging structure (see, e.g., FIG. 4). Such designs can free the region directly underneath the keyplate at the front of the computer mouse that is typically occupied by conventional mouse architectural structures (e.g., keyswitch and supporting hardware) and electronic components, allowing novel computer mouse designs, while retaining the legacy type feeling of a mechanical mouse key that users have grown accustomed to and come to expect. However, it also allows further design of the UX itself, as the design of the keyplates benefits from further mechanical factors, e.g., keyplate stiffness and distance of actuation to the pivot point, hence allowing to intentionally modulate the key feeling. This would not be possible with conventional designs, as their UX is directly afforded by the electromechanical switch configured directly under the keyplate and user's finger. Some examples can include a modular rear mounted key switch (e.g., switch modules) that can be non-destructively removed and reinserted/replaced at different locations without disassembling the computer mouse (e.g., separating the top case and bottom case), as shown and described below at least with respect to FIGS. 4A-4C and FIGS. 7A-7C. In another example, a modular key plate can be non-destructively removed and reinserted/replaced, including in different locations without disassembling the computer mouse. Different keyswitches and their corresponding placement relative to the pivoting/hinging structure may provide a different UX and can change force requirements for actuation, among other advantages, as further described below. Similarly, different types of keyplates can be coupled to a support bar at different locations, which can allow a user to customize keyplate length, force profile, and more, as further described below at least with respect to FIGS. 10A-10F. In some embodiments, these modifications can be performed without adjusting or calibrating any hardware. In some cases, a set of manufacturing and assembly variations, referred to as a tolerance stack, are associated with the keyplate and keyswitch, as well as their corresponding mechanical architecture. Various embodiments described herein have a substantially improved tolerance stack because the keyswitch, keyplate, and corresponding architecture are all directly or indirectly coupled to the top case, rather than both the top case and bottom case, as found in conventional computer mouse architectures.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1 shows a simplified example of a computer system 100 that can include any of a variety of host computing devices and computer peripheral devices, including computer peripheral devices (e.g., a computer mouse) that can be configured to perform aspects of the various inventive concepts described herein. Computer system 100 can include computer 110, monitor 120, input device 130, and keyboard 140. In some embodiments, input device 130 can be a computer mouse, a remote-control device, a game controller (e.g., game pad, joystick, flight stick, etc.) or elements thereof (e.g., hat switch), a media controller device, or other suitable device that can be used to convert analog inputs into digital signals for computer processing. In some cases, keyboard 140 can be a "qwerty" style keyboard, or any suitable input device (e.g., internet-of-things device, AR/VR controller, or the like). For computer system 100, input device 130 and keyboard 140 can be configured to control various aspects of computer 110 and monitor 120, as would be appreciated by one of ordinary skill in the art with the benefit of this disclosure. Monitor 120, input device 130, and keyboard 140 may be referred to as "computer peripheral devices." Computer peripheral devices 120-140 can be communicatively coupled to host computing device 110.

Computer 110 can be any suitable computing device including, but not limited to, a desktop computer, a laptop computer, a tablet or "phablet" computer, a smart phone, a PDA, a wearable device (e.g., smart watches, smart glasses), virtual reality/augmented reality (AR/VR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor 302 of FIG. 3) to control aspects of the host computing device, for instance, via the one or more computer peripheral devices.

Figure 2:
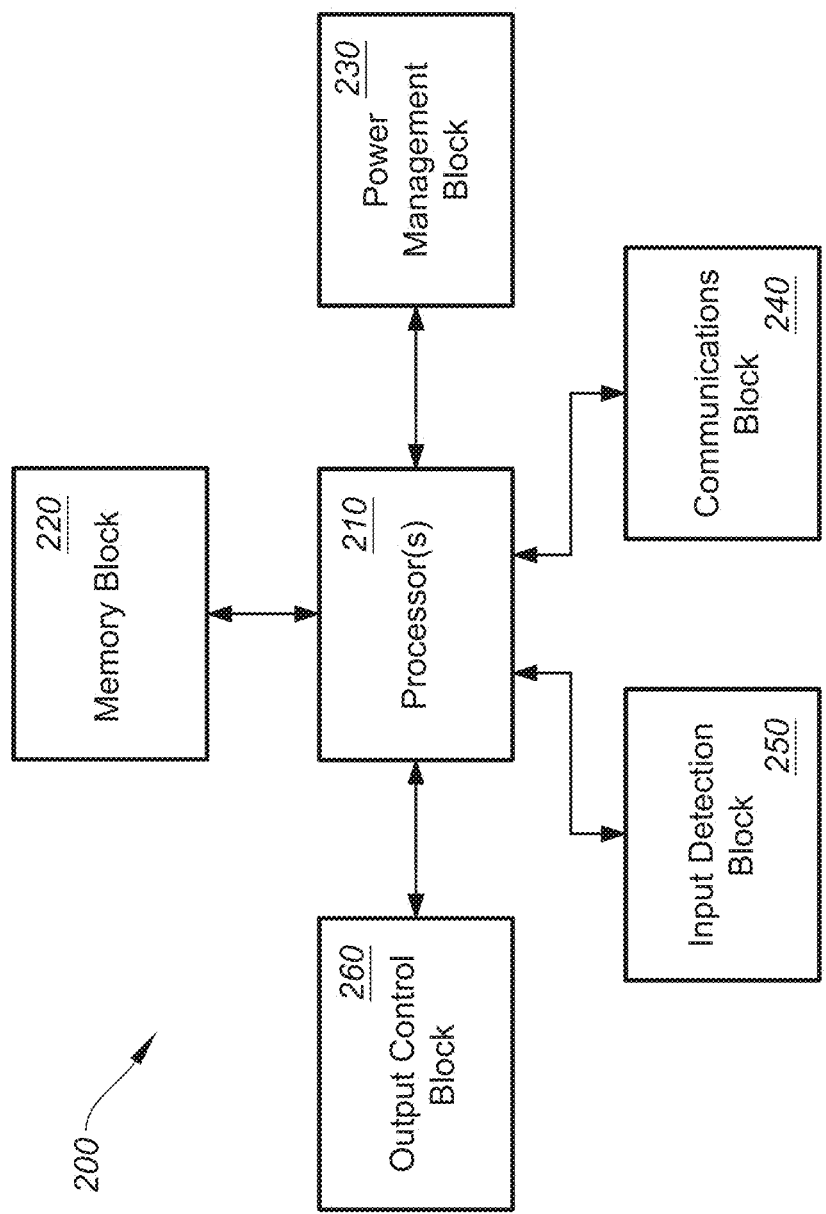
FIG. 2 shows a system for operating a computer peripheral device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices shown or not shown herein but within the wide purview of the present disclosure. System 200 may include processor(s) 210, memory 220, power management system 230, communication module 240, input detection system 250, and output control system 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 may be implemented as separate blocks, or alternatively, more than one system block may be implemented in a single block. In the context described herein, system 200 can be incorporated into any computer peripheral devices (e.g., computer mouse 130, input devices generally, or the like) described or mentioned herein, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer mouse 130 (e.g., system blocks 220-260). Alternatively or additionally, some of system blocks 220-260 may include additional dedicated processor(s), which may work in conjunction with processor(s) 210. For instance, MCUs, μCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some embodiments, multiple processors may increase performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM), and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the computer peripheral device, such as a detected movement of the computer peripheral device, a sensor (e.g., optical sensor, accelerometer, movement sensors), activation of one or more input elements (e.g., key structures, buttons, sliders, touch-sensitive regions, etc.), or the like. In some aspects, stored data may be aggregated and sent via reports to a host computing device.

In certain embodiments, memory 220 can store the various data described throughout this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute various operations as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications system 240, etc.). In certain embodiments, the functions provided by power management system 230 may be incorporated into processor(s) 210. Alternatively, some embodiments may not include a dedicated power management system. For example, functional aspects of power management system 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection system 250, output control system 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHZ), etc. One of ordinary skill in the art with the benefit of this disclosure would appreciate the many modifications, variations, and alternative embodiments thereof.

Input detection system 250 can control the detection of a user-interaction with input elements on an input device. For instance, input detection system 250 can detect user inputs from motion sensors, keys (e.g., smart key structures, conventional keys), or buttons (e.g., depressible elements), roller wheels, scroll wheels (e.g., rotation of a scroll wheel in a first (e.g., forward) and second (e.g., backward) direction, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), force sensing (e.g., detecting force on a scroll wheel to rotate in a first or second direction via a force sensitive element such as an FSR, piezo device, etc.), audio based detection such as voice input (e.g., via microphone), or the like, as would be appreciated by one of ordinary skill in the art with the benefit of this disclosure. Alternatively, the functions of input detection system 250 or subset thereof can be subsumed by processor 210, or in combination therewith.

In some embodiments, input detection system 250 can detect a touch or touch gesture on one or more touch sensitive surfaces on computer mouse 130. Input detection system 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection system 250 can include touch and/or proximity sensing capabilities. Some examples of the types of touch/proximity sensors may include, but are not limited to, resistive sensors (e.g., air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection system 250 may include a movement tracking sub-block that can be configured to detect a relative displacement (movement tracking) of a computer peripheral device. For example, input detection system 250 optical sensor(s) such as IR LEDs and an imaging array of photodiodes to detect a movement of a computer peripheral device relative to an underlying surface. A computer peripheral device may optionally include movement tracking hardware that utilizes coherent (laser) light. Moving tracking can provide positional data (e.g., delta X and delta Y data from last sampling) or lift detection data. For example, an optical sensor can detect when a user lifts the computer peripheral device (e.g., computer mouse 130) off of an underlying surface (also referred to as a "work surface") and can send that data to processor 210 for further processing. In some embodiments, processor 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMD, or another device). Accelerometers can further determine if the computer peripheral device has been lifted off an underlying surface and can provide movement data that may include the velocity, physical orientation, and acceleration of a computer peripheral device. In some embodiments, gyroscope(s) can be used in lieu of or in conjunction with accelerometer(s) to determine movement or input device orientation.

In some embodiments, output control system 260 can control various outputs for a corresponding computer peripheral device. For instance, output control system 260 may control a number of visual output elements (e.g., LEDs, LCD or LED screens/keys), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular systems, it is to be understood that these systems are defined for convenience of description and are not intended to imply a particular physical arrangement of component parts. Further, the systems need not correspond to physically distinct components. Systems can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection system 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
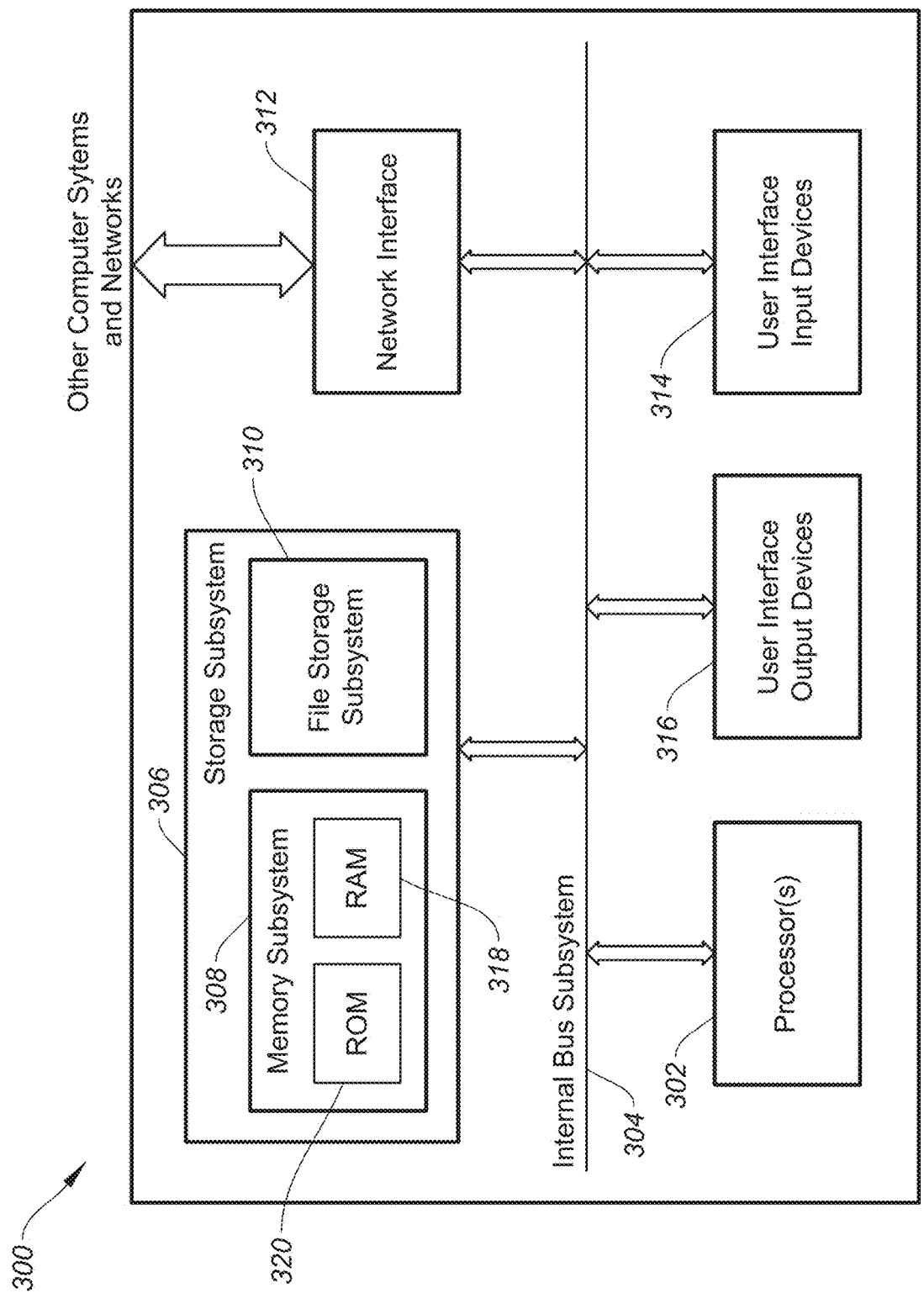
FIG. 3 is a simplified block diagram of a host computing device, according to certain embodiments.

FIG. 3 is a simplified block diagram of a host computing device 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing any method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Overview of Modular Architecture

Various embodiments described herein utilize a modular (button) clicking architecture where elements can be brought together by design and choice from a palette of technologies. A same clicking design can accommodate different electromechanical elements, such as haptic or sensing elements, paired with any required mechanical features for good UX and usability, and any combination thereof.

In some embodiments, a novel characteristic includes configuring the haptic element or electromechanical microswitches at the rear of the keyplate, thereby reversing the clicking system by placing it behind a pivoting or hinging structure (e.g., fulcrum), rather than the conventional under-the-key approach. Such designs free the region directly underneath the keyplate of conventional computer mouse structures and electronic components, allowing novel types of mouse designs while retaining the legacy-type button click feeling of a mechanical mouse key (e.g., conventional "click," "quiet," "performance" profiles, or the like). This can materially improve design flexibility for both internal and external elements.

Some embodiments utilize a pivot or hinged-type of mechanical key, in a novel design architecture for pushbuttons in computer peripherals, as those commonly found in computer mouse main keys. Although the embodiments shown and described primary focus on computer mice, it would be understood by those of ordinary skill in the art with the benefit of this disclosure that similar principles could be applied to any suitable computer peripheral device having a similar key architecture as described herein.

Figure 4A:
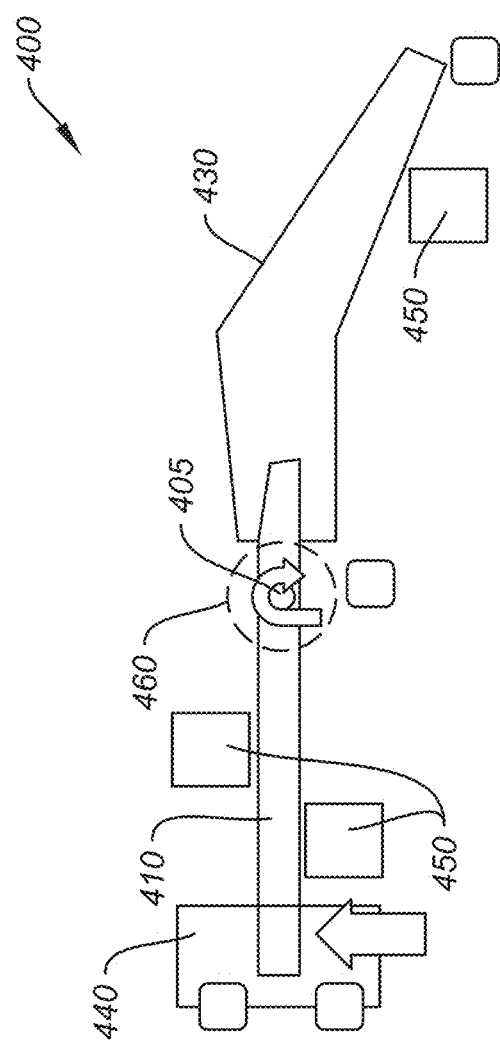
FIG. 4A shows a modular design with multiple options for a clicking architecture on a computer peripheral device, according to certain embodiments.

FIG. 4A shows a modular design 400 with multiple options for a clicking architecture on a computer peripheral device, according to certain embodiments. The modular design includes a support beam 410 coupled to a rotational or pivoting structure 405. Support beam 410 can accommodate a number of different modular components, including removeable keyplate 430, haptic element 440, and can further accommodate other structures such as sensing elements 450, rotational sensing element 460, and various mechanical features 470, as further described below.

Support beam 410 may rotate about a rotational or pivoting structure (referred to generally as a pivot point), a hinge, or any suitable fulcrum-type connection that allows support beam 410 to rotate on an axis. For instance, the pivoting structure can include a pivoting aperture (e.g., a hole) with a shaft configured normal to the length of the shaft and colinear with the axis.

Removeable keyplate 430 may be coupled to support beam 410 such that it can be non-destructively removed and recoupled. Keyplates parameters may differ in various ways (e.g., length, width, contour, weight/mass, connection location on support beam 410, etc.) and can allow a user a variety of different user experiences to accommodate multiple use cases (e.g., productivity, gaming, etc.). In some embodiments, support beam 410 may have multiple coupling points that can be used to couple to and secure removable key plate 430. Removable key plate 430 can be coupled to support beam 410 via frictional fit coupling, a rack and complimentary teeth-type coupling, magnetic coupling, spring loaded ball rack coupling, or any other suitable method of coupling that supports easy removal and reconnection with the support beam 430, as further described below. Removeable keyplate 430 can allow a user to provide a different rotational torque using the same force based in part on their length. In such cases, effectuating a keypress (e.g., activating a keyswitch) may require more or less torque (effectively changing the perceived actuation force to the user (UX)) depending on the parameters (e.g., length, mass, connection location, etc.), as further described below.

Haptic element 440 can be any suitable element configured to provide or contribute to a feedback profile for a button press. Haptic element 440 may be a keyswitch, a permanent or embedded magnet (to provide resistance to rotation and magnetic coupling-based feedback on support beam 410), electro-permanent magnet (EPM) click architectures, and/or active haptics elements (e.g., LRA, multi-layer piezoelectric element, etc.). Sensing elements 450 may be configured in any suitable location and may include optical (e.g., reflective, curtain), capacitive, inductive, magnetic (Hall), force or strain gauge, galvanic (contact), or others. Rotational sensing element 460 can be operable to detect rotation of the rotational or pivoting structure and may include optical, magnetic, or other suitable sensing element(s). Some embodiments may include mechanical features 470, such as displacement stoppers, rotation stoppers, dampers, guides, or the like, to limit or control aspects of rotation of support beam 410. This can be achieved by direct contact with support beam 410, or indirect contact (e.g., limit rotation of support beam 410 by dampening and stopping rotation of the keyplate).

By configuring clicking elements (e.g., keyswitch) behind the pivot point, space underneath the keyplate is free (see, e.g., FIG. 11B), enabling the possibility of floating keyplate designs, reduced weight for better performance, improved sustainability and reduced (e.g., less materials used) environmental impact, as no structural or aesthetic materials are needed beneath the keyplate(s). Some examples of such designs are shown at least in FIGS. 11A-16.

Figure 4B:
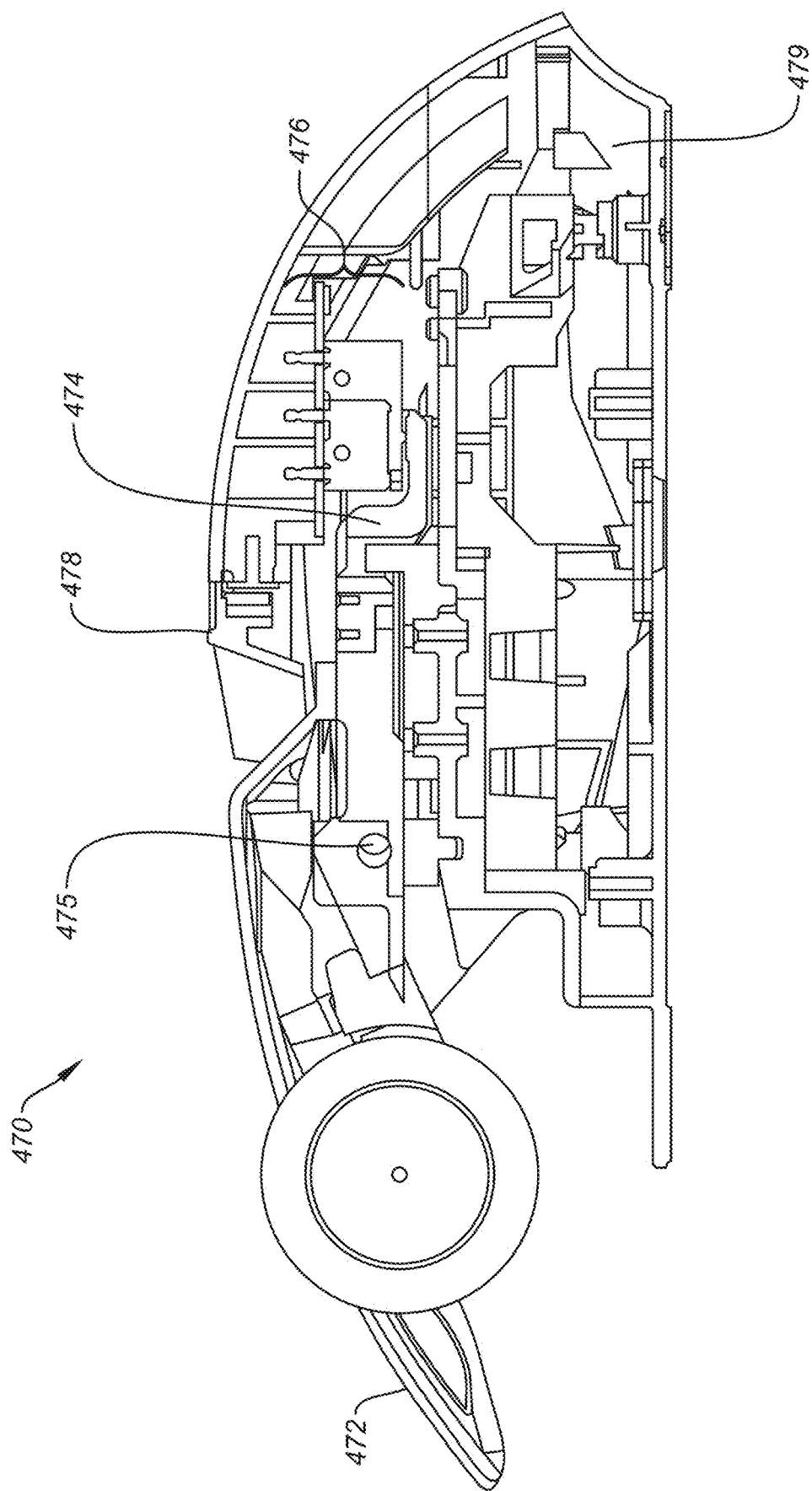
FIG. 4B shows a cross-section of a simplified representation of a computer mouse with an integrated modular design clicking architecture, according to certain embodiments.

FIG. 4B shows a cross-section of a simplified representation of a computer mouse 470 with modular design elements, according to certain embodiments. The modular design includes a support beam 474 that can rotate about pivot point 475 and coupled to removeable keyplate 472 and haptic element 476, which is shown as an electromechanical microswitch configured in an inverted position. The top case 478 can be directly or indirectly coupled to the haptic element 476, keyplate 472, support beam 474, and pivot location 475, or any combination thereof. The bottom case 479 may be decoupled from said elements such that manufacturing tolerance stacking in these structures may not carry through to the bottom case 479, as further described below. Such systems can retain the functionality and user interactions of conventional mouse keyplates, while allowing additional novel features. For example, different clicking elements can be added within the same design. The electromechanical switch can be replaced by other clicking technologies, including dedicated sensing and novel forms of haptics. For sensing technologies, any suitable type of sensor and corresponding metric can be detected, including force, torque, strain, displacement, rotation, distance (e.g. optical, ultrasonic), etc., all of which can be placed in multiple and/or optimal locations in the system. For haptic technologies, any suitable technology can be implemented, including but not limited to magnetic click, electromagnetic click, mechanical actuators, haptic devices such as piezos, LRAs, LRMs, and more, as would be appreciated by one of ordinary skill in the art with the benefit of this disclosure. In some embodiments, the support beam 410 and keyplate 430 may be a single structure, such that the keyplate is not removable.

In some cases, a user may want to replace a keyswitch to upgrade it, to change the clicking feedback profile (e.g., change from clicky to tactile), replace a defective unit, or the like. The reversed, upside-down clicking architecture allows easier access to the internal components of the computer mouse, allowing access to the keyswitch(es) or keyswitch module without significant disassembly (e.g., decoupling the top case and bottom case structures). In some embodiments, the keyswitch or keyswitch module (e.g., comprising the keyswitch and mounting printed circuit board (PCB)) can be directly coupled to the top case. In some embodiments, the keyswitch may be coupled to a separate part that couples directly to the top case. In such cases, the separate part may operate as a sub chassis with the advantage of allowing a user to mount different switches via mechanical mounting points. Moreover, with different sub chassis or by the use of adapters, different sized switches (e.g., differing in height) can be used.

Figure 4C:
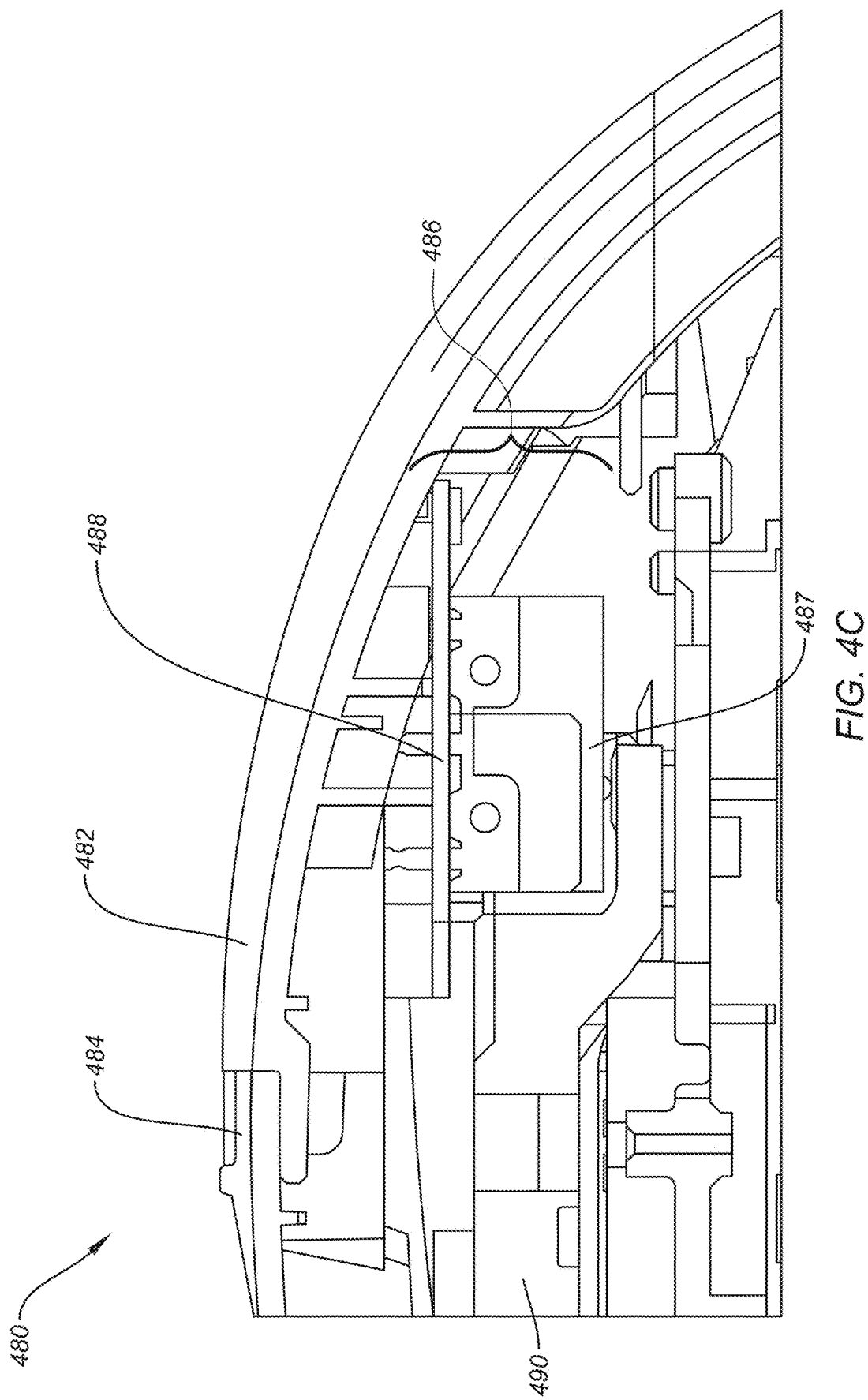
FIG. 4C shows a close up view of a cross-section of a simplified representation of a computer mouse with modular design elements, according to certain embodiments.
Figure 4D:
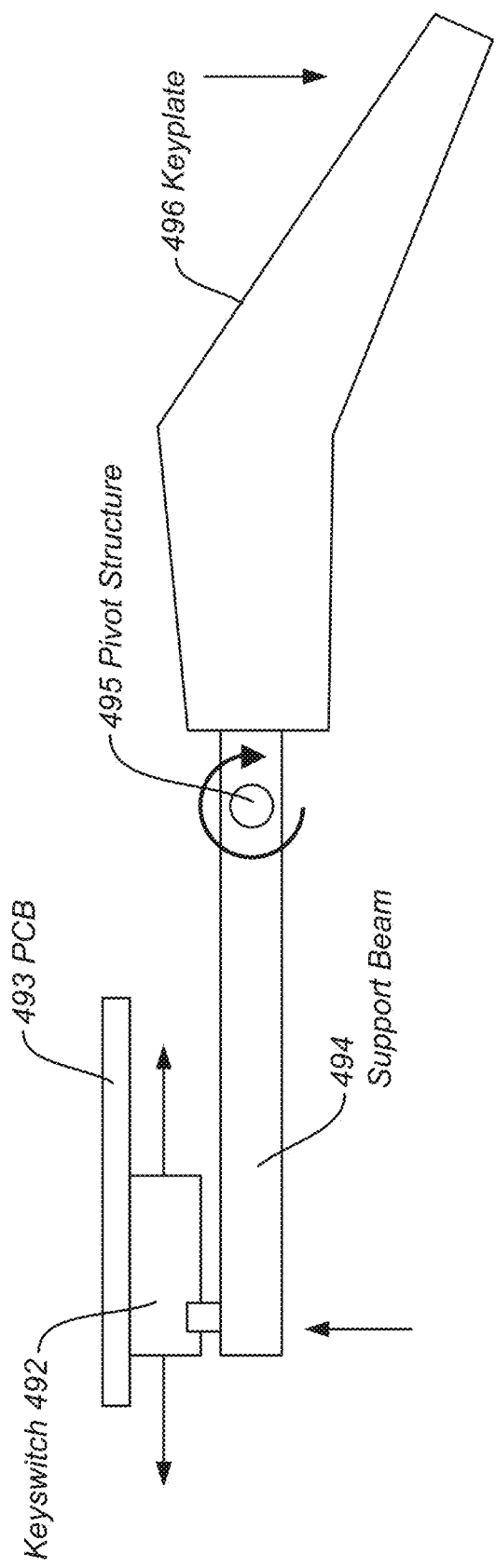
FIG. 4D shows a simplified block diagram of a modular system that allows for different adjustment parameters for mounting a keyswitch, according to certain embodiments.

FIG. 4C shows a close-up view of a cross-section of a simplified representation of a computer mouse 480 with modular design elements, according to certain embodiments. The modular design includes a removeable sub chassis 482 that contains a PCB 488 with preassembled switches 492 and slotted directly to top case 484, engaging with the keyplate articulated system 490. The pivotable reversed clicking architecture can support easy user-customization options to the haptic and click feedback, facilitated by the accessible switch location. Some embodiments allow an adjustment of the switch mounting position and/or keyplate on the support beam. By changing the distance between the pivot point and the keyswitch, due to the lever effect, designers or users can effectively change the functionality range and the afforded feedback given. The operational range as well as force, force variations, and other inherent haptic cues can be easily modified due to these adaptable parameters. Further benefits can include changing the preload and engagement with the keyplate, as well as taking advantage of introducing/mitigating any play within the mechanical system. FIG. 4D shows a simplified block diagram of a modular system that allows for different adjustment parameters for mounting a keyswitch, according to certain embodiments, as further described below.

The assembly of the back chassis can adopt a similar approach of the mouse top case, in a drop-down assembly, where the click module is positioned by dropping the module from above. It can then be locked into place by magnets, clips, or other type of fastener. Other means are possible, such as slotted from the side or behind the mouse (as shown in the picture) or even by having permanent pivot articulated mounts, where the sub chassis is an integrated part of the top case but still allows quick access, as shown and further described below with respect to FIGS. 8A-8C. In certain embodiments, the sub chassis may not be integral to the top case and accessible from the mouse external surface. In such cases, other assembly methods can be used, including mounting from below and directly to the top case.

The sub chassis can be assembled by a multitude of mechanical fixtures, including but not restricted to, slotted elements, location pins and other guiding features, or the like, while being secured with the use of fasteners, clips, clamps, magnets, and the like. Referring back to the reversed clicking architecture, by placing the switches behind the pivot point, the keyplate no longer presses the switches directly like in conventional designs where the keyswitches are configured directly underneath the keyplate touchable area and user fingertip, which enables customization and modular modifications, as described above. For example, the operational range of the keyplate can be modified by changing its stiffness, thus making it perceivably longer or shorter, or by physically changing out the keyplate with a different length, width, mass, or other dimensions. Other design elements can be added and integrated in the system, which may impact and superimpose to the feedback originated from the keyswitch. Such elements can be composed of mechanical stoppers and guides that can affect travel and play to the moving parts (e.g., keyplate travel), and can also include additional dynamic elements such as biasing element(s), which can affect the feedback profile (e.g., torsion spring at the pivot or linear spring between static and/or moving parts). Electrical connections between the switches, switch PCBs, and computer mouse main PCB, can be realized via hardwiring or flex PCBs, either soldered or plugged with connectors, 3D-MID (three-dimensional, spatial circuit carriers, also referred to as a Molded Interconnect Device, or Mechatronic Integrated Device), with local contact points, or quick-release and or non-permanent electromechanical systems, such as spring loaded pogo-pins, or a combination of thereof.

Figure 5A:
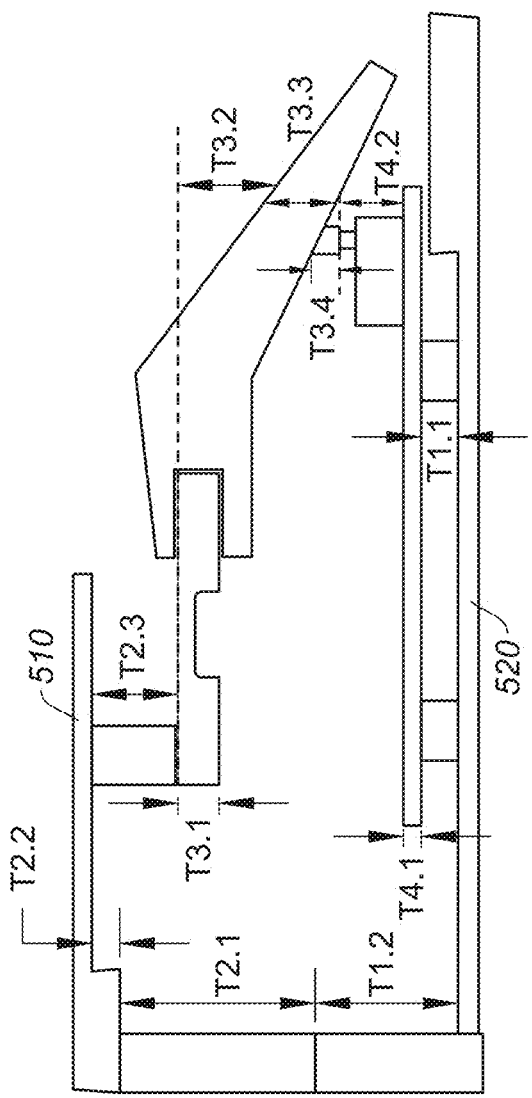
FIG. 5A shows an example of a number of contributing features of a conventional computer mouse design that affect the overall tolerance stack.

The reversed architecture of the keyswitch location also minimizes the tolerance stacking between moving components, e.g., the keyplate and the keyswitch moving parts, and the surrounding supporting elements. In a conventional mouse, a very long chain of both static and moving parts introduce a considerable mechanical tolerance stacking, due primarily to part design deviations in production. Electromechanical microswitches have operational travel in the range of tenths of millimeters, thus offering a restricted range of functionality. Each involved clicking component contributes to possible deviations in the order of cents of a millimeter. When added and stacked together, the tolerance chain can exceed the operational range of the microswitch, leading to poor UX and even loss of critical function. A primary contributor of the tolerance stack comes from the conventional design of a mouse itself, where the top case contains the keyplate and other mechanical elements, while the bottom case contains the PCB and keyswitches, thus the tolerance stack combines all tolerances associated with both the top case and bottom case. FIG. 5A shows an example of a number of contributing features of a conventional computer mouse that affect the overall tolerance stack, also referred to as tolerance chain deviations, and includes both the top case 510 and bottom case 520. Some of the numerous contributing features in conventional computer mice include T1.1—bottom case from reference bottom surface to PCB mounting points; T1.2—bottom case to top case mounting features; T2.1—top case to bottom case mounting features; T2.2—top case geometry deviation; T2.3—topcase to keyplate mounting features; T3.1—keyplate geometry deviation; T3.2—keyplate mounting reference to touch area; T3.3—keyplate touch region thickness deviation (top to bottom surface); T3.4—keyplate bottom surface to actuator bottom (height); T4.1—PCB thickness deviation; and T4.2—switch total tolerance.

The reversed clicking architecture removes the contribution of the bottom case, as the whole clicking mechanism is now integrated solely with the top case. A well-known issue in the industry, tolerance stacking in conventional designs is very problematic in manufacturing and assembly, and can be very difficult to control or mitigate from product to product. The modular designs described herein, including the reversed architecture (e.g., keyswitch configured behind the pivot location) coupled to top case, can substantially reduce the number of contributing elements to the overall tolerance stack, thus reducing overall tolerances, improving product yields, and other mitigating manufacturing benefits, as would be appreciated by one of ordinary skill in the art with the benefit of this disclosure.

Figure 5B:
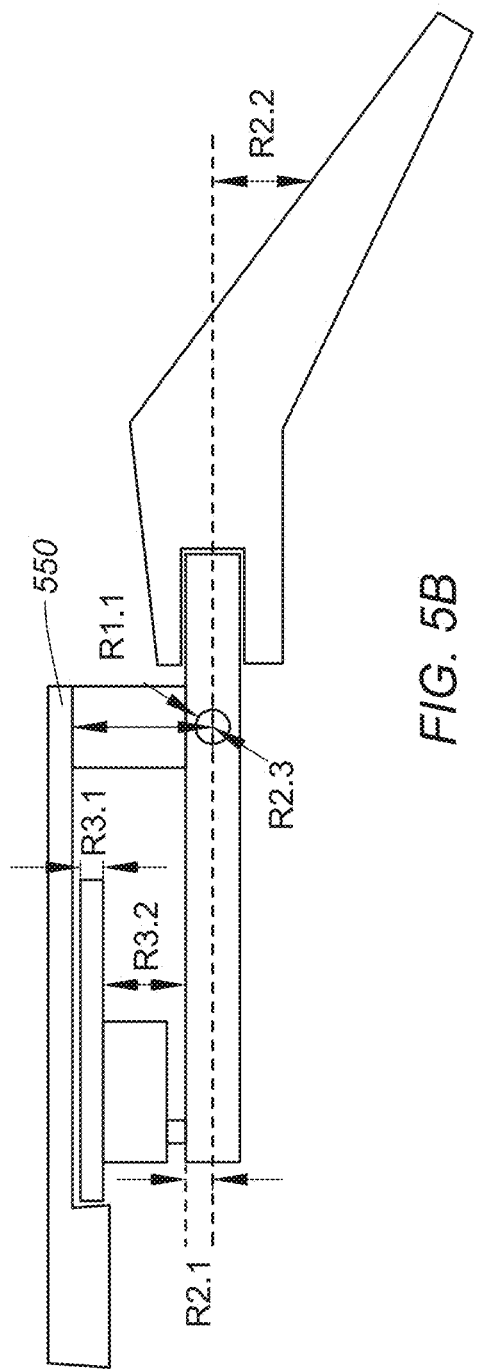
FIG. 5B shows a computer mouse with a reversed clicking architecture that has substantially fewer contributing features that affect the overall tolerance stack, according to certain embodiments.

FIG. 5B shows a computer mouse with a reversed clicking architecture that has substantially fewer contributing features that affect the overall tolerance stack, according to certain embodiments. In contrast to FIG. 5A, only the top case 550 contributes to the tolerance stack, with the bottom case having no contribution or negligible contribution. The tolerance chain deviations for the reversed architecture of FIG. 5B includes R1.1—top case to pivot center; R2.1—keyplate to switch/clicking tech interface; R2.2—keyplate center (e.g., pivot) to touch area surface; R2.3—keyplate bushing to pivot center; R3.1—PCB thickness; and R3.2—switch/tech total tolerance, which is nearly half of the tolerance chain deviations of conventional designs.

Modular Inverted Keyswitch Architecture

Referring back to FIG. 4D, as the keyplate 496 is pressed, a first end of the support beam 494 and keyplate 496 rotate downward relative to the point of rotation (e.g., fulcrum, pivoting structure 495, etc.), causing the second end of the support beam to move up and press the keyswitch 492 configured in an inverted configuration. The keyswitch may be coupled to a PCB 493 or other support system to form a keyplate module. The keyplate module may be insertable and releasable from the computer mouse such that a user can remove and reinsert or replace key switches to change the feedback profile. Furthermore, the location of the key switch relative to the point of rotation can be modified, as further described below. In further embodiments, the support beam and keyplate may be a single monolithic unit and may not be adjustable like the other configurable embodiments described herein.

Silent Magnetic Actuation

FIGS. 6A-6B show a keyplate 600 with magnetic actuation, according to certain embodiments. Keyplate 600 includes pivoting structure 610, biasing mechanism 620, first magnetic element 630 and second magnetic element 640. As keyplate 600 is pressed, the front of keyplate 600 moves down and the rear of keyplate 600 moves up, causing a magnetic field from the first magnetic element 630 to interact with the magnetic field of the second magnetic element 640, which can create a haptic sensation that simulates a click or bump, indicating to the user that a button press is instantiated. The biasing mechanism (e.g., torsion spring) can provide a resistance to rotation and a return force to bring the keyplate back from a depressed position to a neutral, unpressed position. Sensing may be possible via an optical shutter, or other suitable sensing mechanism, to detect a position of the keyplate to set an actuation point. Such embodiments can generate a highly reliable, silent clicking effect for the user, as the keyplate in itself becomes the switch and performs the clicking. In some aspects, a magnet is used to give the click feeling and a shutter is installed in such a way for the closing of the shutter to happen when there is a click due to the magnets. In some embodiments, EPMs can be used in magnet-based reverse clicking architectures.

Modular Keyswitches

Figure 8A:
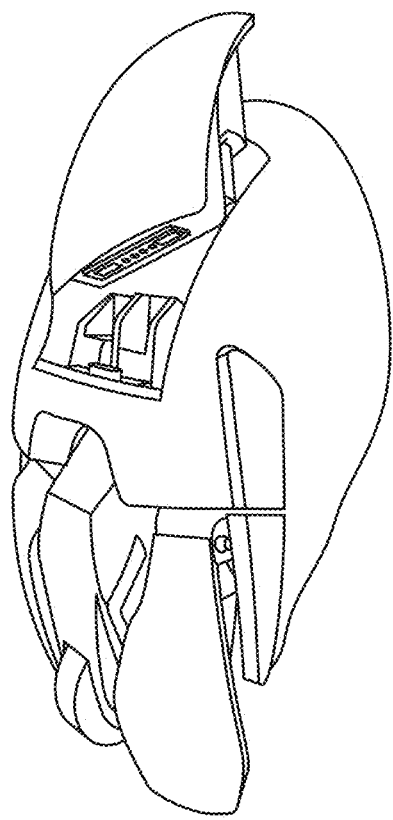
FIGS. 8A-8C show how different keyplate modules can be coupled to a computer mouse at a coupling location, according to certain embodiments.
Figure 8C:
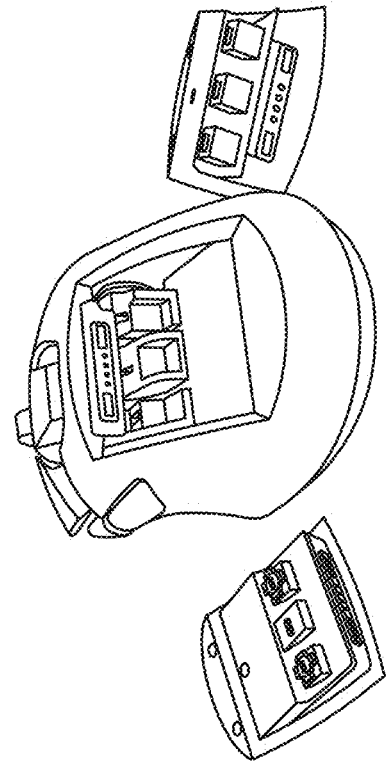
Figure 8B:
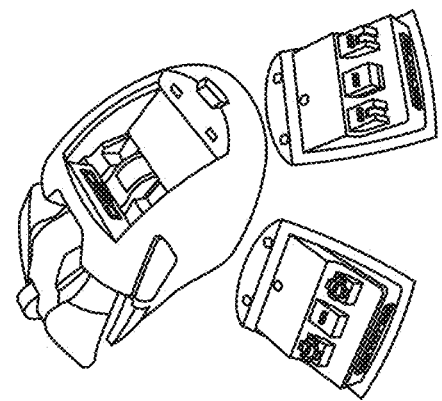

Modular keyswitches can provide options for customization and easy repairability. A keyswitch module may include one or more keyswitches coupled to a PCB and any suitable supporting hardware or mounting infrastructure. The keyswitch module can be designed to be easily accessible, e.g., via the top or rear of the computer mouse-typically via the top case and quickly removed and replaced to customize, repair, and/or upgrade the UX. In some embodiments, two or three keyswitches (e.g., left click, middle click, right click) can be simultaneously removed and replaced, as shown in FIGS. 8A-8C.

FIGS. 7A-7C show a simplified block diagram depicting a sequence of removing and replacing a keyswitch module in a computer mouse, according to certain embodiments. A keyplate 700 is coupled to a first end of a support beam 710. The support beam 710 is configured to rotate around a pivot structure 712. As the keyplate and first end of support beam 710 is moved down, a second end of support beam 710 moves up and contacts the keyswitch module 720 at the keyswitch 725, thereby instantiating a key press event.

Keyswitch module 720 can include a PCB 722, keyswitch 725, and one or more coupling structures configured to couple keyswitch module 720 to the computer mouse. In some cases, keyswitch module 720 is coupled to the computer mouse chassis at a coupling location 730, as shown in FIG. 7A. In FIG. 7B, keyswitch module 720 is decoupled and removed from coupling location 730. In FIG. 7C, a new keyswitch module 740 including keyswitch 745 and PCB 750 is coupled to coupling location 730. Due to a difference is distance of the actuating element of keyswitch 745 relative to the pivot structure 712, a same force on keyplate 700 may impart a different force on keyswitch 740. For example, if keyswitch 745 is configured at a farther distance from pivot structure 712 than keyswitch 725, support beam 710 may impart a greater moment of force on keyswitch 745, as would be appreciated by one of ordinary skill in the art with the benefit of this disclosure. There are many possibilities for modifying the feedback profile for the system that may include differences in the actuating force required to activate the keyswitch, a distance of the keyswitch from the pivot structure, or the like. By moving the switch closer or further from the pivot structure, the click force will either increase with shorter travel or decrease with higher travel. In some embodiments, the keyswitch module can be coupled to the coupling location via a frictional fit coupling, a magnetic coupling, a mechanical coupling, or the like, and any combination thereof.

Modular Keyplates

Some embodiments may utilize modular keyplates that can enable quick and easy keyplate replacement. Modular keyplates allow for customization options including, but not limited to, changing the keyplate size, shape/contour, mass, length, color, and more, as would be appreciated by one of ordinary skill in the art with the benefit of this disclosure. Different size keyplates can be easily swapped out by a user to accommodate different hand sizes or styles of grip (e.g., fingertip, palm, claw).

FIGS. 9A-9B show simplified block diagrams that depict how different modular keyplates can be coupled to a computer mouse, according to certain embodiments. In FIG. 9A, a keyplate 900 is coupled to a first end of a support beam 910. The support beam 910 is configured to rotate around a pivot structure 912. As the keyplate and first end of support beam 910 is moved down, a second end of support beam 910 moves up and contacts the keyswitch module 920 at the keyswitch 925, thereby instantiating a key press event. In FIG. 9B, a smaller keyplate 930 is coupled to support beam 910 at the first end. In response to a user pressing a tip of each keyplate at a same force, smaller keyplate 930 may impart a smaller moment of force on keyswitch 925 that a force imparted by keyplate 900 because the tip of keyplate 930 is closer to pivot structure 912 that the tip of keyplate 900. A modular keyplate can be coupled to a support beam in a plurality of different ways, including but not limited to, a frictional fit coupling, a rack and complementary compliant teeth coupling, magnetic coupling, a spring loaded ball rack coupling, and the like, as would be appreciated by one of ordinary skill in the art with the benefit of this disclosure.

FIGS. 10A-10F show various simplified block diagrams of different mechanisms for coupling a modular keyplate to a computer mouse, according to certain embodiments. FIGS. 10A-10B show how a modular keyplate can be coupled to a support beam at a number of different locations (e.g., different distances from the support beam pivot structure) via a multiple point mounting position, according to certain embodiments. In such embodiments, the keyplate can be on a rail and the position of the keyplate would lock into position on to rack. The user can simply pull or push the keyplate in the desired position and lock it in. For example, the keyswitch may include a lip that engages a rack at different positions and locks into place when engaged. FIGS. 10C-10D show how a modular keyplate can be coupled to a support beam at a number of different locations via a magnetic coupling system, according to certain embodiments. For example, a magnet embedded in the modular keyplate, in the support beam, or both, may impart a strong magnetic coupling between them. FIGS. 10E-10F show how a modular keyplate can be coupled to a support beam at a number of different locations via a spring loaded ball rack, according to certain embodiments. For example, a spring loaded ball may make a sufficiently strong mechanical coupling with a receiving portion on the support beam to secure the keyplate. In such embodiments, the keyplates can be on a slider, rail, or other guiding system. The precise position can be secured or locked by a suitable positioning mechanism, such as magnetic, mechanical biasing mechanism (e.g., spring), compliant mechanism, hardware (e.g., screw), or the like. Further, the keyplates can be modular with smaller or larger keyplates. Some embodiments may include the reverse clicking architecture described above with no modularity in the keyplate or keyswitch(es), or any combination there, as would be appreciated by one of ordinary skill in the art with the benefit of this disclosure.

Lighting Effects Underneath the Modular Keyplates

Figure 11A:
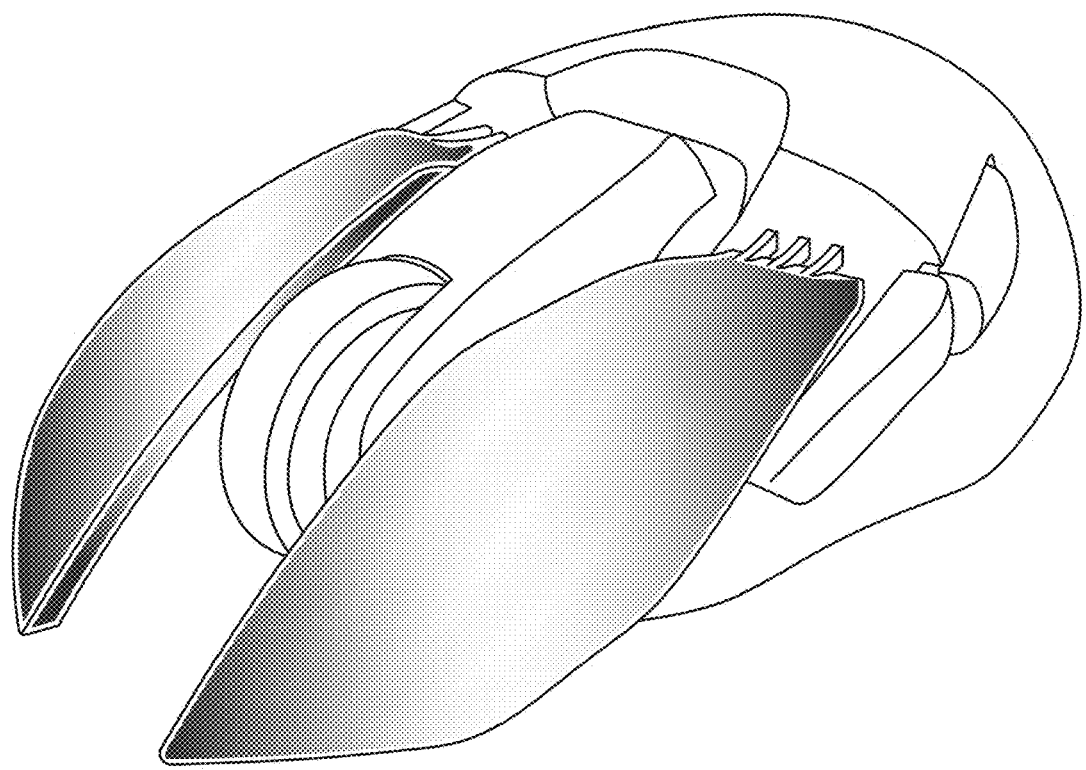
FIG. 11A shows a computer mouse with illuminated key plates, according to certain embodiments.
Figure 11B:
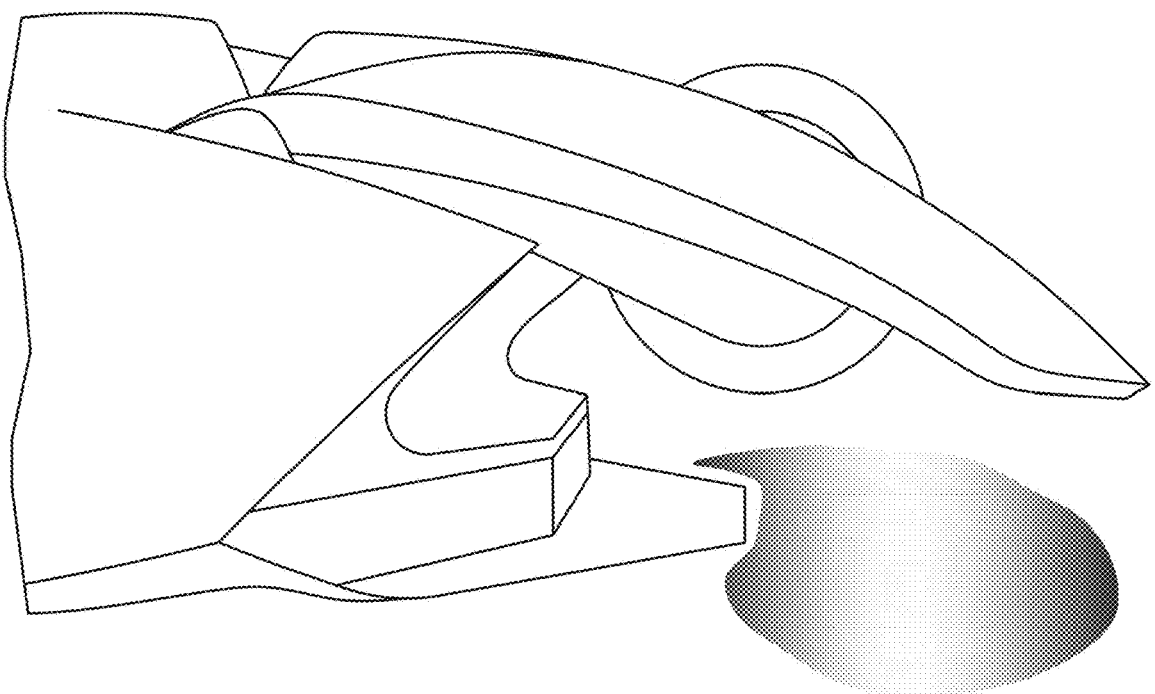
FIG. 11B shows a computer mouse with lighting elements directing light below the key plates and onto an underlying work surface, according to certain embodiments.

In addition to the advantages brought by the modular keyswitch architecture described above, including the moving of the keyswitch to behind the pivot structure, the removal and replacement of key switches and key plates, as well as the improvement of the overall manufacturing tolerance stack, a number of novel lighting architectures can be applied that take advantage of the open floating key plate designs described herein, as shown for instance in computer mouse 400 of FIG. 4B. One or more lighting elements can be configured in, under, and around the keyplates to create novel lighting schemes that heretofore would not be possible due to the structural elements and key switch typically configured under the key plate in conventional mouse designs. For instance, FIG. 11A shows a computer mouse with illuminated key plates, according to certain embodiments. FIG. 11B shows a computer mouse with lighting elements directing light below the key plates and onto an underlying work surface, according to certain embodiments.

Figure 12B:
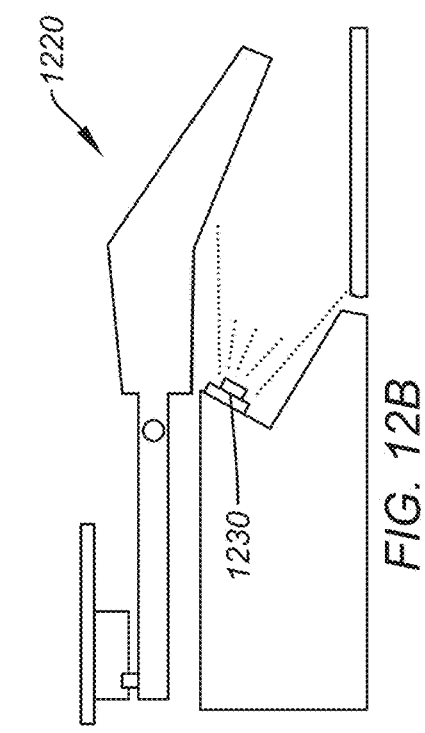
FIGS. 12A-12D show simplified block diagrams of different lighting systems for a computer mouse, according to certain embodiments.
Figure 12D:
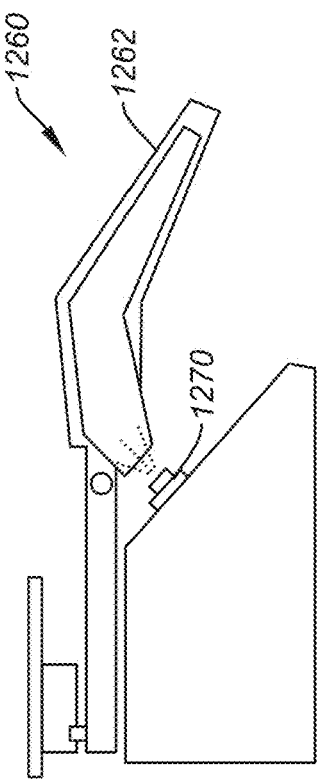
Figure 12A:
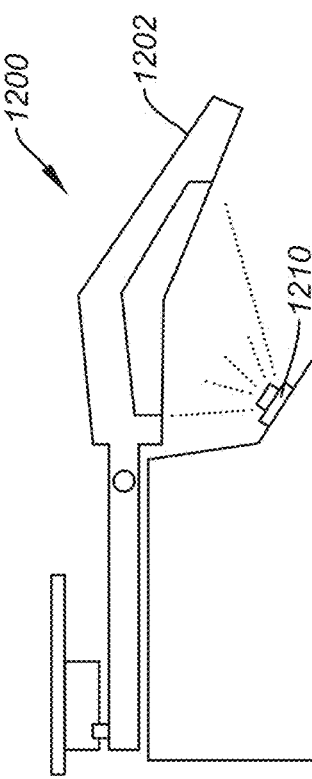

FIG. 12A shows a simplified block diagram of a lighting system 1200 for a computer mouse according to certain embodiments. Lighting system 1200 includes a lighting element(s) 1210 that projects light on the bottom of a keyplate 1202. Keyplate 1202 may include surface graphics that may be illuminated by the projected light. In some aspects, the bottom of keyplate 1202 may be reflective such that it reflects light over an area for an aura effect.

FIG. 12B shows a simplified block diagram of a lighting system 1220 for a computer mouse according to certain embodiments. Lighting system 1220 includes a lighting element(s) 1230 that projects light on to an underlying work surface. In some embodiments, the lighting element(s) may include stencils or optical focusing or manipulating infrastructure to display images, shapes, patterns, or the like.

Figure 12C:
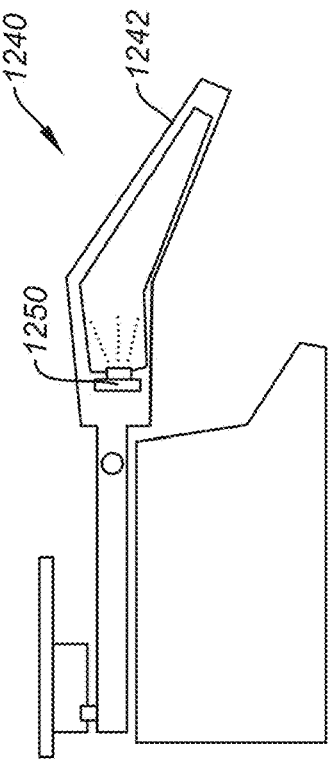

FIG. 12C shows a simplified block diagram of a lighting system 1240 for a computer mouse according to certain embodiments. Lighting system 1240 includes a lighting element 1250 embedded within keyplate 1242 that emits light into the keyplate. Keyplate 1242 may include light guides, reflective surfaces, transparent sections, or a combination thereof to illuminate the keyplate in a variety of ways, as would be appreciated by one of ordinary skill in the art with the benefit of this disclosure.

FIG. 12D shows a simplified block diagram of a lighting system 1260 for a computer mouse according to certain embodiments. Lighting system 1260 includes a lighting element 1270 that projects light into a keyplate 1262 via a light pipe embedded therein.

Figure 13:
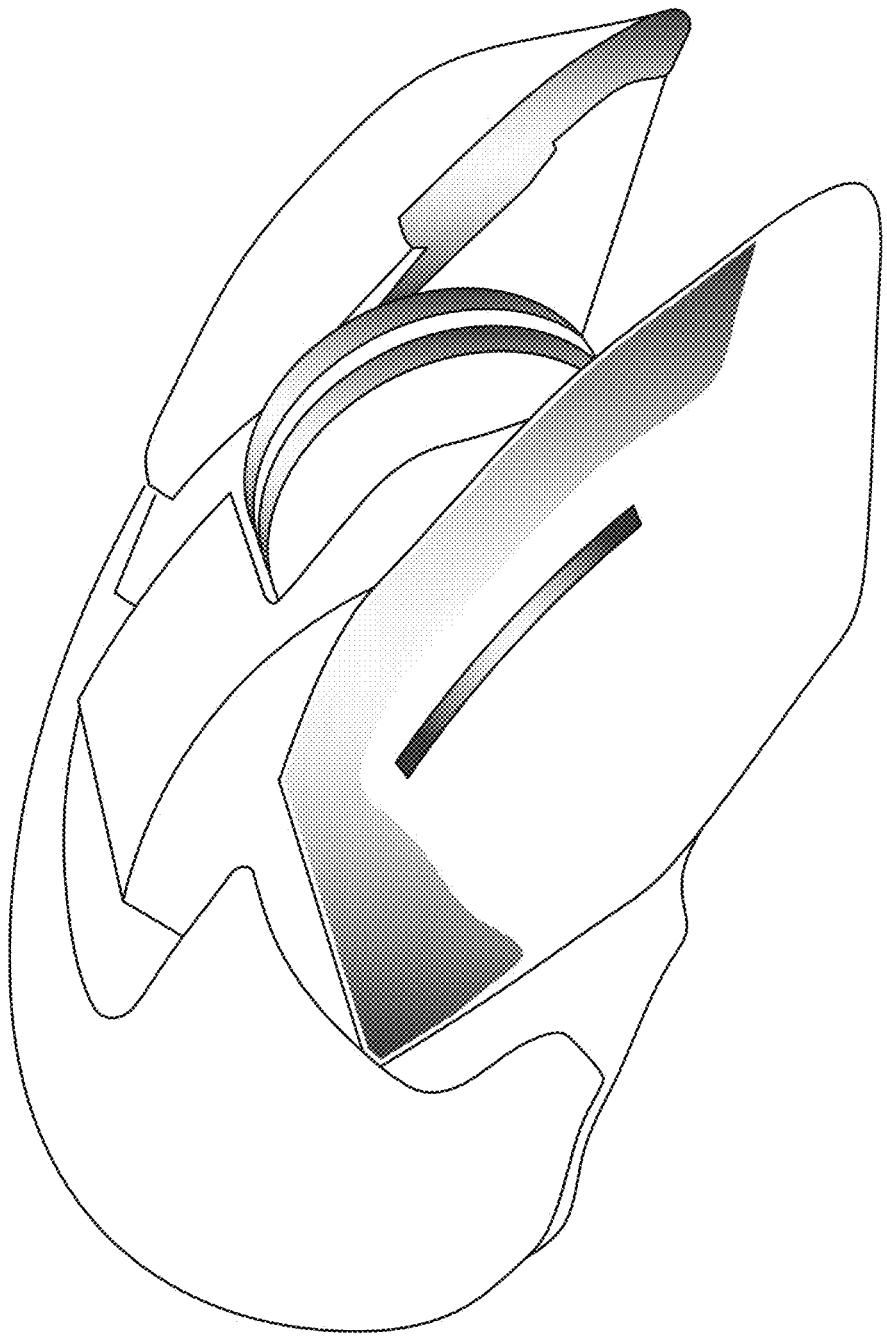
FIGS. 13-16 show various embodiments of computer mice with novel lighting schemes that take advantage of the floating key plate designs made possible by the modular reverse keyswitch architectures described herein.
Figure 14:
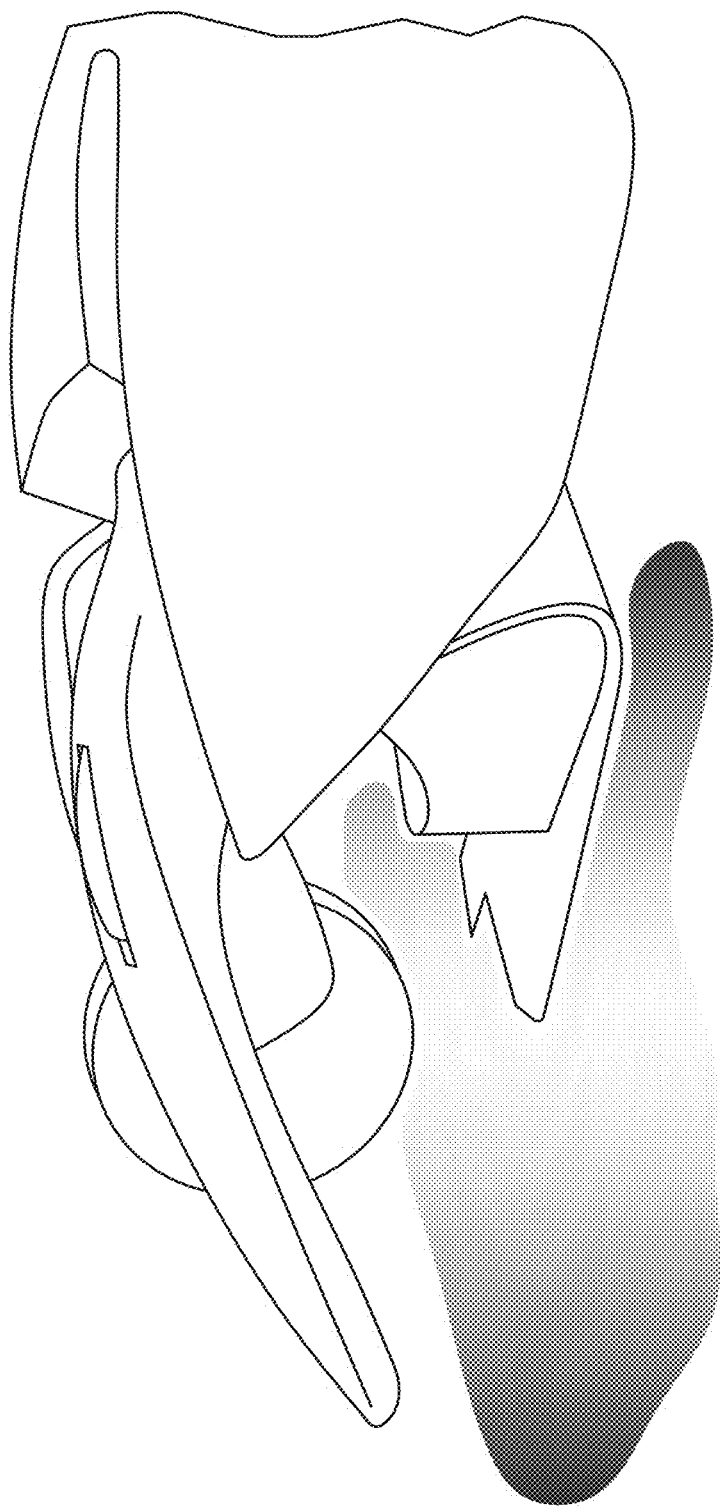
Figure 15:
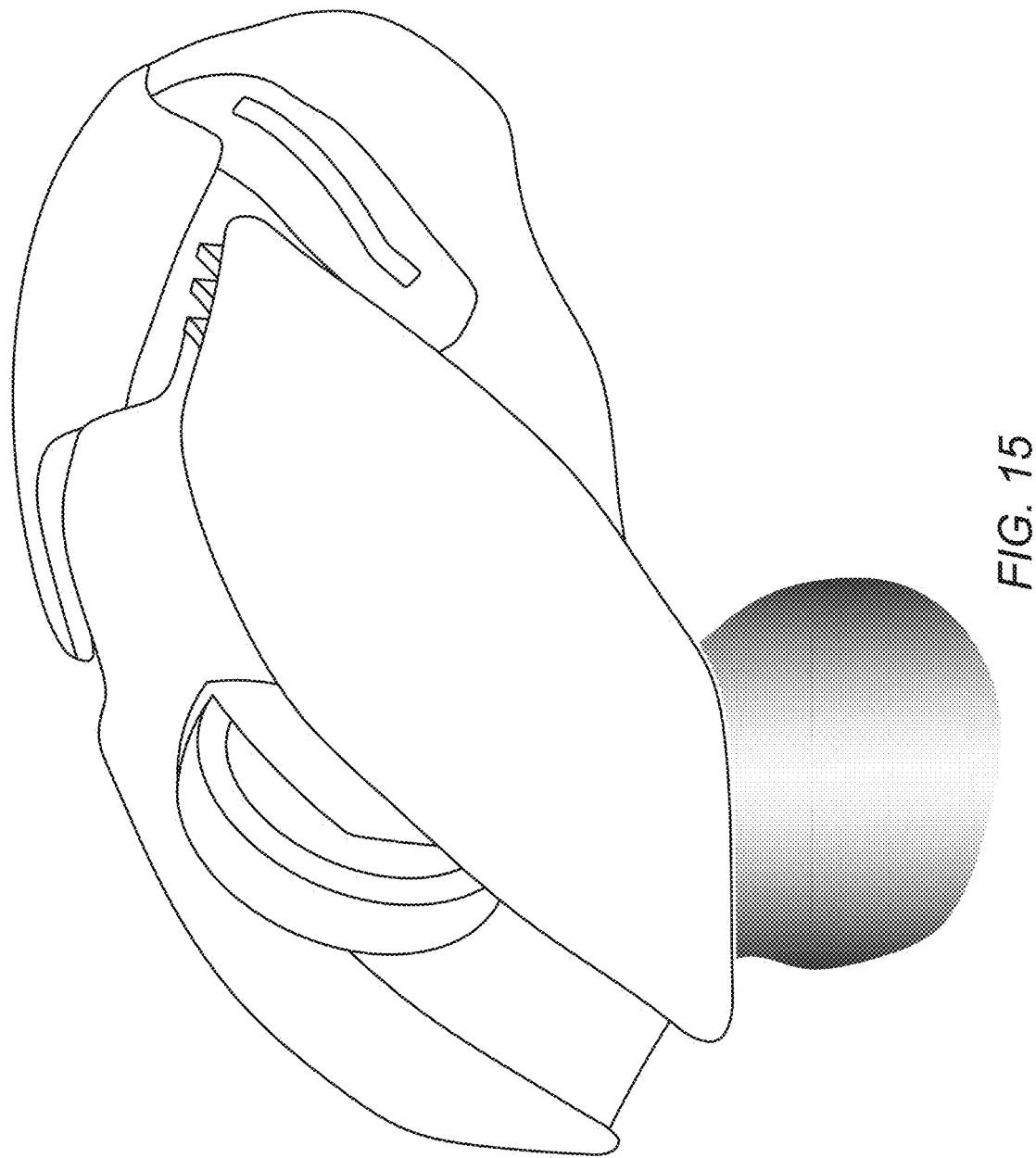
Figure 16:
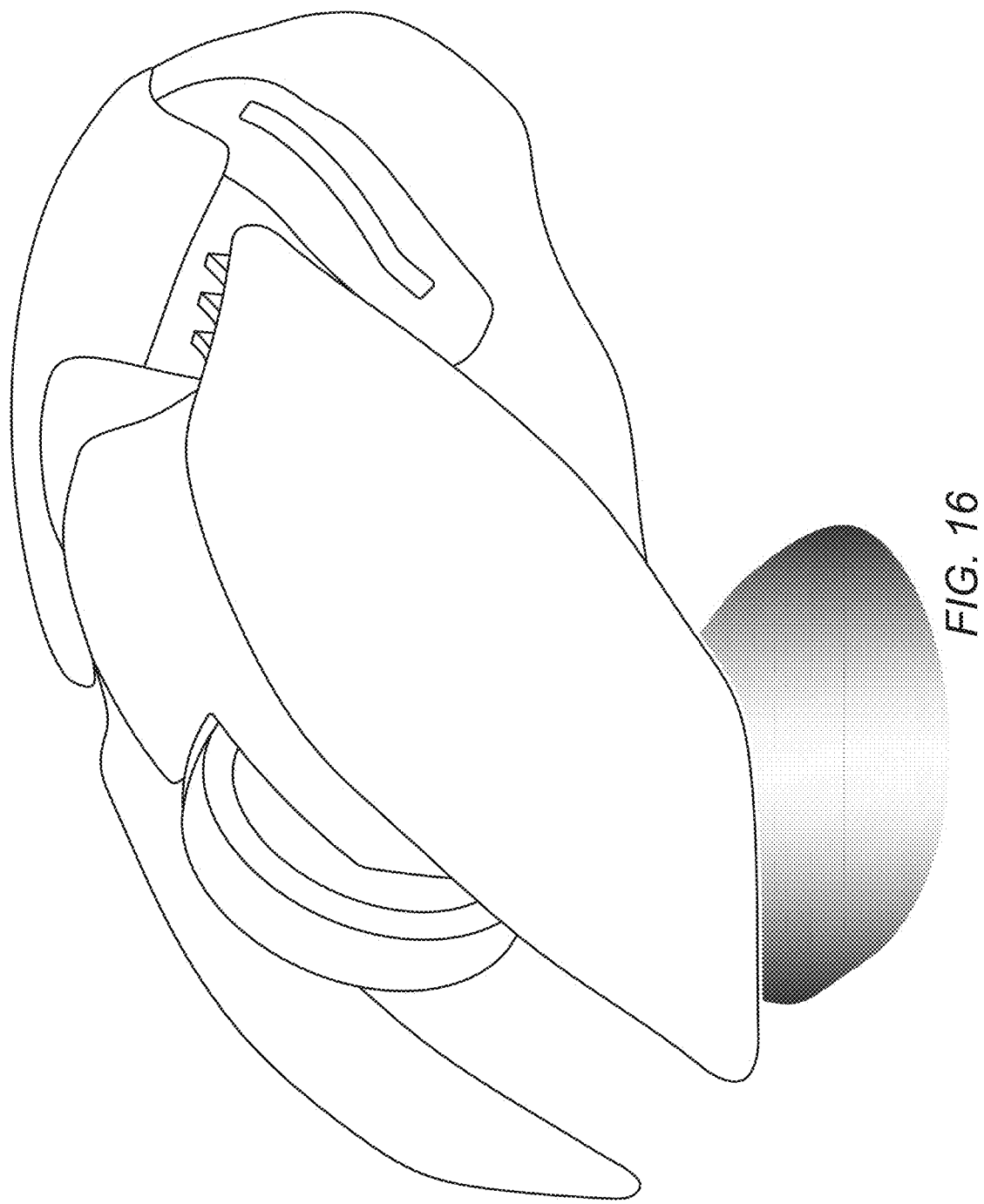

FIGS. 13-16 show various embodiments of computer mice with novel lighting schemes that take advantage of the floating key plate designs made possible by the modular reverse keyswitch architectures described herein. FIG. 13 shows a computer mouse with various lighting schemes that light a number of structural features including aspects of the keyplate and scroll wheel, according to certain embodiments. FIG. 14 shows a computer mouse with a lighting scheme that illuminates structural features including aspects of the scroll wheel, as well as the underlying work surface, according to certain embodiments. FIG. 15 shows a computer mouse with a lighting scheme that illuminates structural features including aspects of the scroll wheel and the underlying work surface, according to certain embodiments. FIG. 16 shows a computer mouse with a lighting scheme that illuminates the underlying work surface, according to certain embodiments.

EXAMPLE EMBODIMENT

In certain embodiments, a modular computer mouse comprises a chassis; a support beam including a first end configured to receive and secure a removable keyplate, a second end opposite the first end, and a fulcrum (e.g., pivoting structure) positioned between the first end and the second end, the fulcrum coupled to the chassis such that the support beam is operable to rotate in a plane orthogonal to orientation of the fulcrum. The computer mouse further comprises a keyswitch coupled to the chassis in an inverted configuration, wherein the second end portion of the support beam moves up and contacts the keyswitch as the first end of the support beam is moved down. The keyswitch may be coupled to a circuit board (e.g., PCB) mounted to the chassis forming a keyswitch module, wherein when a top side of the first end of the support beam receives a first pressing force, the second end of the support beam moves up causing a top side of the second end to contact the keyswitch and provide a second pressing force proportional to the first pressing force, causing the activated keyswitch to generate a control signal when the second pressing force reaches a threshold activation.

In some embodiments, the keyswitch module is operable to be coupled to the chassis at a plurality of different coupling locations, each coupling location operable to cause the second pressing force on the keyswitch to increase or decrease based on a distance from the keyswitch to the fulcrum. The fulcrum can include a pivoting aperture with a shaft configured within the pivoting aperture, wherein the support beam is rotatably coupled to the shaft, allowing the support beam to rotate on an axis that is colinear with the shaft. A housing (e.g., top case) can be configured to house the chassis, the support beam, and keyswitch, and the keyswitch may be non-destructively removeable from and couplable to the chassis without disassembly of the housing. In some embodiments, the keyswitch is coupled to a modular circuit board, which can be coupled to the chassis via at least one of a frictional fit coupling, a magnetic coupling, or a mechanical, releasable coupling, or other solution, and any combination thereof. One of ordinary skill in the art with the benefit of this disclosure would appreciate the many modifications, variations, and alternative embodiments thereof.

In some embodiments, the housing configured to house the chassis, the support beam, and keyswitch, wherein the removeable keyplate is non-destructively removeable from and couplable to the support beam without disassembly of the housing. The removeable keyplate can be coupled to the support beam via at least one of a frictional fit coupling, a rack and complementary compliant teeth coupling, magnetic coupling, spring loaded ball rack coupling, or the like. One of ordinary skill in the art with the benefit of this disclosure would appreciate the many modifications, variations, and alternative embodiments thereof. In some aspects, the removeable keyplate is operable to be coupled to the support beam at a plurality of different coupling locations, each coupling location operable to cause the first pressing force on the removeable keyswitch to increase or decrease based on a distance of the keyswitch to the fulcrum.

In certain embodiments, the removeable keyplate includes a transparent region, and the modular computer mouse may include a lighting element coupled to the chassis under the removeable keyplate and configured to project light into the transparent region of the removeable keyplate. In some cases, the removeable keyplate includes a light pipe region, where the modular computer mouse includes a lighting element coupled to the chassis and configured to project light into the light pipe region of the removeable keyplate. Some embodiments may include a lighting element coupled to the chassis under the keyplate that is configured to project light into an underlying work surface directly under the removeable keyplate. Further embodiments may have the removeable keyplate with a transparent region, where the computer mouse includes a lighting element configured within the support beam or the removeable keyplate and configured to project light into the transparent region of the removeable keyplate.

In some embodiments, the computer mouse includes a housing with a top case and a bottom case, wherein the chassis, the support beam, and keyswitch are coupled to the top case, wherein the modular computer mouse includes manufacturing and assembly variation tolerances that aggregate as a tolerance stack, the tolerance stack associated with a placement of the chassis, the support beam, and the keyswitch relative to the top case, and the tolerance stack is associated with the top case and is not substantially affected by the bottom case. That is, the bottom case provides less than 5%, 1%, 0.1%, or other amount (e.g., typically less than 1%), of contribution to the tolerance stack.

Any combination of the novel concepts presented herein can be applied to a computer peripheral device. For instance, some embodiments may employ a reverse clicking architecture, as described above, with modular components (e.g., modular keyplate and/or keyswitch system) or without modular components. Some embodiments may include a reverse clicking architecture and novel lighting schemes for the keyplate or keyplate adjacent (e.g., illuminating other mouse features, work surface, etc.) without any modularity (e.g., with fixed keyswitch(es), keyplates, or the like). Some embodiments may employ the reverse clicking architecture without modular components or without the novel lighting schemes described herein. One of ordinary skill in the art with the benefit of this disclosure would appreciate the many modifications, variations, and alternative embodiments thereof.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for case of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer mouse comprising:
   a chassis;
   a support beam including:
      a first end configured to receive and secure a removable keyplate;
      a second end opposite the first end; and
      a fulcrum positioned between the first end and the second end, the fulcrum coupled to the chassis such that the support beam is operable to rotate in a plane orthogonal to orientation of the fulcrum; and
a keyswitch coupled to the chassis in an inverted configuration,
wherein the second end of the support beam moves up and contacts the keyswitch as the first end of the support beam is moved down.

2. The computer mouse of claim 1 wherein the keyswitch is coupled to a circuit board mounted to the chassis forming a keyswitch module, wherein when a top side of the first end of the support beam receives a first pressing force, the second end of the support beam moves up causing a top side of the second end to contact the keyswitch and provide a second pressing force proportional to the first pressing force, and
wherein the keyswitch is operable to generate a control signal when the second pressing force reaches a threshold activation force that activates the keyswitch.

3. The computer mouse of claim 2 wherein the keyswitch module is operable to be coupled to the chassis at a plurality of different coupling locations, each coupling location operable to cause the second pressing force on the keyswitch to increase or decrease based on a distance from the keyswitch to the fulcrum.

4. The computer mouse of claim 1 wherein the fulcrum includes a pivoting aperture, and wherein the computer mouse further includes:
a shaft configured within the pivoting aperture, wherein the support beam is rotatably coupled to the shaft, allowing the support beam to rotate on an axis that is colinear with the shaft.

5. The computer mouse of claim 1 further comprising a housing configured to house the chassis, the support beam, and keyswitch,
wherein the keyswitch is non-destructively removable from and couplable to the chassis without disassembly of the housing.

6. The computer mouse of claim 5 wherein the keyswitch is coupled to a modular circuit board, the modular circuit board being coupled to the chassis via at least one of:
a frictional fit coupling;
a magnetic coupling; or
a mechanical, releasable coupling.

7. The computer mouse of claim 1 further comprising a housing configured to house the chassis, the support beam, and keyswitch,
wherein the removeable keyplate is non-destructively removeable from and couplable to the support beam without disassembly of the housing.

8. The computer mouse of claim 7 wherein the removeable keyplate is coupled to the support beam via
a rack and complementary compliant teeth coupling.

9. The computer mouse of claim 7 wherein the removeable keyplate is operable to be coupled to the support beam at a plurality of different coupling locations, each coupling location operable to cause the first pressing force on the removeable keyswitch to increase or decrease based on a distance of the keyswitch to the fulcrum.

10. The computer mouse of claim 1 wherein the removeable keyplate includes a transparent region, the computer mouse further comprising a lighting element coupled to the chassis under the removeable keyplate and configured to project light into the transparent region of the removeable keyplate.

11. The computer mouse of claim 1 wherein the removeable keyplate includes a light pipe region, the computer mouse further comprising a lighting element coupled to the chassis and configured to project light into the light pipe region of the removeable keyplate.

12. The computer mouse of claim 1 further comprising a lighting element coupled to the chassis under the keyplate and configured to project light into an underlying work surface directly under the removeable keyplate.

13. The computer mouse of claim 1 wherein the removeable keyplate includes a transparent region, the computer mouse further comprising a lighting element configured within the support beam or the removeable keyplate and configured to project light into the transparent region of the removeable keyplate.

14. The computer mouse of claim 1 further comprising a housing including a top case and a bottom case,
wherein the chassis, the support beam, and keyswitch are coupled to the top case,
wherein the computer mouse includes manufacturing and assembly variation tolerances that aggregate as a tolerance stack, the tolerance stack associated with a placement of the chassis, the support beam, and the keyswitch relative to the top case, and
wherein the tolerance stack is associated with the top case and is not substantially affected by the bottom case.

15. A computer mouse comprising:
a chassis;
a support beam including:
a first end coupled to or integrated with a keyplate;
a second end opposite the first end; and
a pivot structure positioned between the first end and the second end, the pivot structure coupled to the chassis such that the support beam is operable to rotate;
a keyswitch coupled to the chassis in an inverted configuration,
wherein the second end of the support beam moves up and contacts the keyswitch as the first end of the support beam is moved down.

16. The computer mouse of claim 15 wherein the keyswitch is coupled to a circuit board mounted to the chassis forming a keyswitch module, wherein when a top side of the first end of the support beam receives a first pressing force, the second end of the support beam moves up causing a top side of the second end to contact the keyswitch and provide a second pressing force proportional to the first pressing force, and
wherein the keyswitch is operable to generate a control signal when the second pressing force reaches a threshold activation force that activates the keyswitch.

17. The computer mouse of claim 15 further comprising a lighting element coupled to the chassis under the keyplate and configured to project unobstructed light into an underlying work surface directly under the keyplate.

18. The computer mouse of claim 15 wherein the keyplate includes a transparent region, the computer mouse further comprising a lighting element configured within the support beam or the keyplate and configured to project light into the transparent region of the keyplate.

19. The computer mouse of claim 15 wherein the keyplate includes a light pipe region, the computer mouse further comprising a lighting element coupled to the chassis and configured to project light into the light pipe region of the keyplate.

20. The computer mouse of claim 15 further comprising a housing including a top case and a bottom case,
wherein the chassis, the support beam, and keyswitch are coupled to the top case, wherein the computer mouse includes manufacturing and assembly variation tolerances that aggregate as a tolerance stack, the tolerance stack associated with a placement of the chassis, the support beam, and the keyswitch relative to the top case, and
wherein the tolerance stack is associated with the top case and is not substantially affected by the bottom case.

* * * * *